United States Patent [19]
Sasaki et al.

[11] Patent Number: 5,864,648
[45] Date of Patent: *Jan. 26, 1999

[54] MAGNETIC RECORDING/REPRODUCING APPARATUS

[75] Inventors: Masamichi Sasaki, Yokohama; Toyotaka Machida, Kashiwa; Osamu Samuta, Yokohama, all of Japan

[73] Assignee: Victor Company of Japan, Ltd., Yokohama, Japan

[*] Notice: The term of this patent shall not extend beyond the expiration date of Pat. No. 5,822,491.

[21] Appl. No.: 895,487

[22] Filed: Jul. 16, 1997

Related U.S. Application Data

[63] Continuation-in-part of Ser. No. 770,880, Dec. 20, 1996.

[30] Foreign Application Priority Data

Sep. 27, 1996 [JP] Japan .................................. 8-277492

[51] Int. Cl.[6] .................................................. H04N 5/91
[52] U.S. Cl. ............................ 386/78; 386/79; 360/77.01
[58] Field of Search ................................... 386/1, 21, 31, 386/46, 69, 78, 79, 80, 81, 86, 87, 113; 360/77.01, 77.12, 77.13, 77.14, 75

[56] References Cited

U.S. PATENT DOCUMENTS 4,943,873  7/1990  Kawasaki ............................... 360/77.5
5,475,662  12/1995  Miyagawa et al. .................. 369/44.26

*Primary Examiner*—Thai Tran
*Assistant Examiner*—Christopher Onuaku
*Attorney, Agent, or Firm*—Michael N. Meller

[57] ABSTRACT

Magnetic recording/reproducing apparatus is constructed in such that a personal computer is electrically connected to the apparatus through connectors, and that a track deviation caused by the apparatus itself is measured through the personal computer by a nondestructive manner upon tape running operation by installing a test magnetic tape formed with recorded tracks having almost no track deviation to the apparatus so as to be helically wound around the rotary drum rotating with magnetic heads in a predetermined angular range and direction. The apparatus has a device for stepwise shifting the magnetic heads in a longitudinal direction of the test magnetic tape for causing the magnetic head positions to displace stepwise and relatively with respect to the tracks along a track traversing line of the recorded tracks in response to a command directed from the personal computer and a device for outputting values of an FM signal measured at a plural measuring points predetermined along a head scanning direction of the recorded track at every stepwise shifted magnetic head positions as the magnetic head scans the recorded tracks of the test magnetic tape. The values of the FM signal outputted from the device are inputted to the personal computer for further processing.

3 Claims, 17 Drawing Sheets

Rotary Head Scanning Direction ⟶ (Y)
*Fig. 8-(1)* 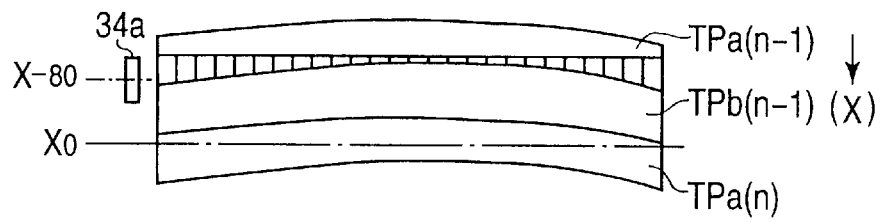
*Fig. 8-(2)* 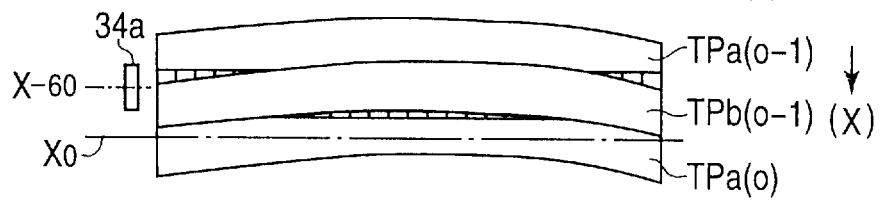
*Fig. 8-(3)* 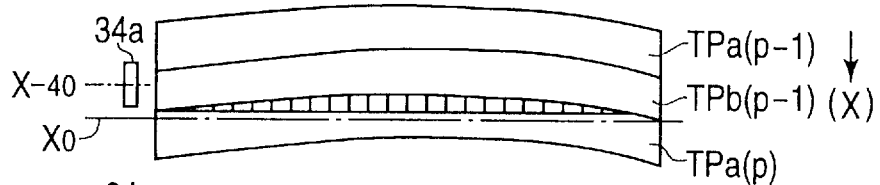
*Fig. 8-(4)* 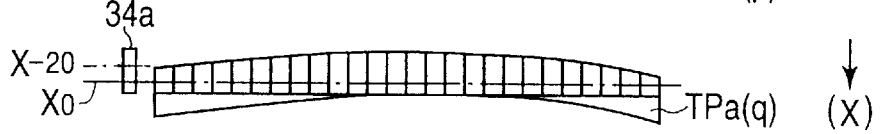
*Fig. 8-(5)* 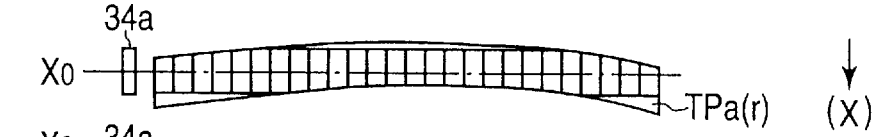
*Fig. 8-(6)* 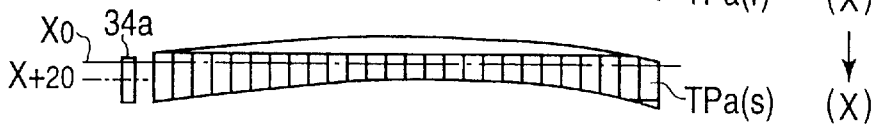
*Fig. 8-(7)* 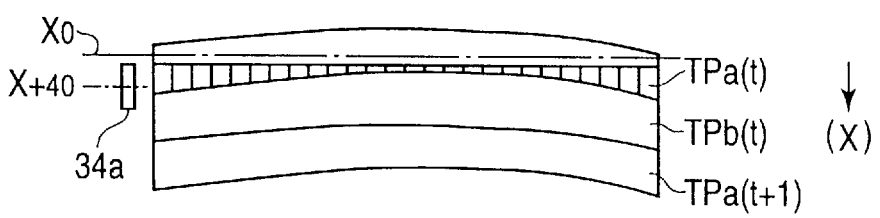
*Fig. 8-(8)* 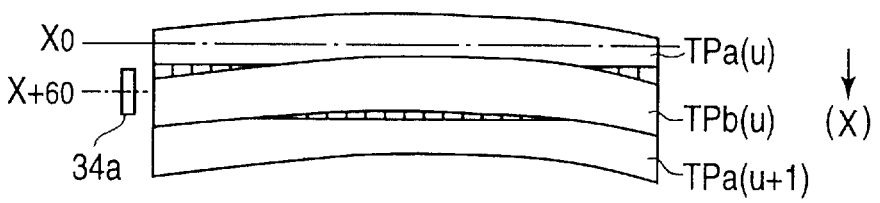
*Fig. 8-(9)* 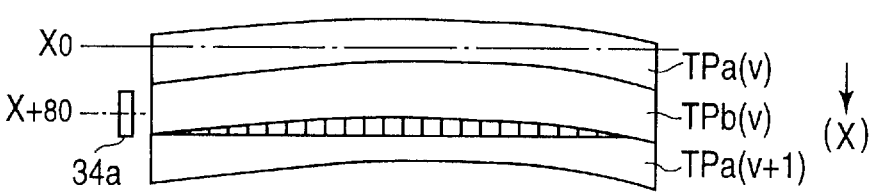

MAGNETIC RECORDING/REPRODUCING APPARATUS

BACKGROUND OF THE INVENTION

1. Field of the Invention:

This is a Continuation-In-Part Application from the U.S. patent application Ser. No. 770,880 filed on Dec. 20, 1996 and relates to an improvement of a magnetic recording/reproducing apparatus, and particularly, relates to a magnetic recording/reproducing apparatus capable of measuring its inherent track deviation from a standard, tracks to be measured are obliquely recorded by the apparatus in a predetermined direction on a magnetic tape upon a tape running operation through a personal computer by installing a test magnetic tape in the apparatus, in which recorded tracks are formed in a helical scanning recording so as to have almost no track deviation.

2. Description of the Related Art:

It is well known that in magnetic recording and reproducing apparatuses employing a helical scanning method such as a video tape recorder (VTR) which records a video and/or audio signal in a form of FM carrier and a digital audio tape recorder (DAT), a magnetic tape wound on a pair of reels is pulled out thereof and is helically wound around a rotary drum having magnetic heads in a predetermined angular range in the apparatus, and the magnetic tape is recorded and reproduced being helically scanned by the magnetic heads rotated together with the rotary drum.

FIG. 1 is a perspective view of an ordinary magnetic recording/reproducing apparatus employing a helical scanning method in the prior art;

FIG. 2 is a plan view showing magnetic heads installed in a rotary drum in the ordinary magnetic recording/reproducing apparatus shown in FIG. 1;

FIG. 3 is a plan view showing a tape pattern having a plurality of recorded tracks formed on a magnetic tape by using the ordinary magnetic recording/reproducing apparatus;

FIG. 4 is a plan view showing track deviations of the recorded tracks on a magnetic tape by using the magnetic recording/reproducing apparatus in the prior art;

Referring to FIG. 1, in an ordinary magnetic recording/reproducing apparatus 10A employing the helical scanning system, a tape cassette 1A is mounted on a front side of a chassis 11. In the tape cassette 1A, there are accommodated a magnetic tape 2A of which one and another ends are respectively wound on a supply reel 3A and a take-up reel 4A.

In FIG. 1, a reference character 12 denotes a tension arm provided on a tape supply side of a rotary drum 30 as a tape loading device, the arm 12 moves reciprocally on the chassis 11, 13 a tension pole supported by the tension arm 12, 14 a first loading base, 15 and 16 a tape guide roller and a slant pole both provided on the first loading base 14, 17 a second loading base, 19 and 18 a tape guide roller and a slant pole both provided on the second loading base 17 at the tape take-up side of the rotary drum 30. The magnetic tape 2A is pulled out from a front side of the tape cassette 1A and is helically wound around the rotary drum 30 at a predetermined angular range by the guide rollers 15, 19 and the slant poles 16, 18.

Reference character 20 denotes a full track erase head provided on the tape supply side of the rotary drum 30 for erasing the recorded signals on the magnetic tape 2A, 21 an impedance roller for stabilizing tape running, 22 a capstan rotatably provided on the tape take-up side of the rotary drum 30 on the chassis 11 for moving the magnetic tape 2A at a constant speed, 23 a pinch roller arm, 24 a pinch roller supported by the pinch roller arm 23 for detachably engaging with the capstan 22, and 25 an AC head (a combined audio and control signals head) provided on the tape take-up side of the rotary drum 30 for recording and reproducing audio signals and control signals.

The rotary drum 30 provided on the chassis 11 generally comprises a lower drum 31 fixed on the chassis 11 and an upper rotary drum 33 coaxially and rotatably provided on a shaft 32 over the lower drum 31. The lower drum 31 has a lead 31a helically formed thereon for leading the magnetic tape 2A helically by causing a lower edge of the magnetic tape 2A to contact with the lead 31a. On a lower surface of the upper rotary drum 33 opposing to an upper surface of the lower drum 31, there are provided a plurality of rotary magnetic heads (referred to as rotary heads) 34 so as to protrudes slightly from an outer periphery of the upper rotary drum 33.

As shown in FIG. 2, the plurality of the rotary heads 34 include a pair of ch-1 and ch-2 standard playing time mode (referred to as SP Mode) video heads 34a, 34b each having a different azimuth angle from another, i.e, of +6° or −6° for the SP Mode, a pair of an extended playing time mode (referred to as EP Mode) video heads 34c, 34d each having a different azimuth angle from another, i.e, +6° or −6° for the EP Mode, and a pair of high fidelity audio (referred to as audio) heads 34e, 34f each having a different azimuth angle from another, i.e., +30° or −30°, and respective heads of each pair are symmetrically opposed separated at 180° from each other. Here, these pairs, i.e., the ch-1 and ch-2 EP Mode video heads 34c, 34d and the ch-1 and ch-2 SP Mode video heads 34a, 34b and the ch-1 and ch-2 audio heads 34e, 34d are orderly disposed at a predetermined angular interval in a direction of a drum rotation (an arrow K).

Referring to FIG. 1 again, in the apparatus 10A, the magnetic tape 2A wound around the rotary drum 30 is driven in a direction of an arrow S by being pinched between the capstan 22 and the pinch-roller 24, and at the same time, the rotary heads 34 together with the upper rotary drum 33 are rotated with the shaft 32 in a direction of an arrow K. Thus, video signal and high-fidelity audio signals (L and R) are recorded on the magnetic tape 2A with the rotary heads 34 in such a manner that a plurality of recorded tracks TP are obliquely formed to have a predetermined angle to a longitudinal direction of the magnetic tape 2A. The predetermined angle of the recorded tracks TP is defined by a tape running direction and a relative speed between the magnetic tape 2A and the rotary heads 34. Incidentally, these recorded tracks TP can not be visually observed directly.

As shown in FIG. 3, in the apparatus 10A based on a well known VHS standard or S-VHS standard, loci of the recorded tracks TP caused by the rotary heads 34 vary according to the kind of the rotary heads 34 used. Specifically, the recorded tracks TPa, TPb are formed to have a width of about 58 μm by using the ch-1 and ch-2 SP Mode video heads 34a, 34b. These recorded tracks are referred to as ch-1 and ch-2 SP Mode video tracks TPa, TPb, hereinafter.

On the other hand, recorded tracks TPc, TPd are formed to have a narrower width of about 19 μm by using the ch-1 and ch-2 EP Mode video heads 34c, 34d. These recorded tracks are referred to as ch-1 and ch-2 EP Mode video tracks TPc, TPd, hereinafter.

Further, recorded tracks TPe, TPf are recorded in a deeper and inside part of a magnetic layer of the magnetic tape 2A under the ch-1 and ch-2 SP Mode video tracks TPa, TPb by using the ch-1 and ch-2 audio heads 34e, 34f. These recorded tracks are referred to as ch-1 and ch-2 audio tracks TPe, TPf hereinafter. Upon recording, the ch-1 and ch-2 audio tracks TPe, TPf are to be recorded preceding the ch-1 and ch-2 SP Mode video tracks TPa, TPb. Upon forming the ch-1 audio track TPe on the magnetic tape 2A, there are two cases. Specifically, one is that the ch-1 audio track TPe is formed preceding the track TPa about one video frame period by the ch-1 audio head 34e located behind (with respect to the direction K) the ch-1 SP Mode video head 34a, and another is that the ch-1 audio track TPe is formed by the ch-2 audio head 34f located before the ch-1 SP Mode video head 34a.

Further, though an illustration is not provided, the ch-1 and ch-2 audio tracks TPe, TPf may be formed under the ch-1 and ch-2 EP Mode video tracks TPc, TPd by using the ch-1 and ch-2 audio heads 34e, 34f.

On an upper edge portion and a lower edge portion of the magnetic tape 2A, there are formed linear audio tracks A and T and a linear control track CT by using the AC (Audio/Control) head 25.

In the ordinary recording and reproducing apparatus 10A employing the helical scanning recording system such as the VHS and S-VHS standards, the recorded tracks TP obliquely formed by the rotary heads 34 have a predetermined track angle, for instance, 5° 58' 9.9" in the SP Mode and 5° 56' 48.1" in the EP Mode for the track formed on a running magnetic tape as shown in FIG. 3 and as shown with two-dotted chain lines in FIG. 4. In this case, an allowable track deviation of each of the recorded tracks TP is specified in the industry standard, for instance, not more than 14 μm in the SP Mode and not more than 10 μm in the EP Mode so as to hold compatibility of the recorded magnetic tape 2A with the apparatus as made conforming to the same standard. Actually, the values of the track deviations thereof are determined so as to satisfy target values of no more than 10 μm in the SP Mode and of no more than 7 μm in the EP Mode.

However, when the tape running system of the magnetic tape 2A does not operate well in the apparatus 10A or the rotary heads 34 are inaccurately mounted on the upper rotary drum 33, a track deviation occurs on each of the recorded tracks as shown with real lines in FIG. 4. This causes a compatibility problem of the magnetic tape 2A in the apparatus 10A made according to the same standard. In this case, it will be understood that a plurality of recorded tracks formed by a certain rotary head 34 has a same track deviation because they are formed in a same recording condition.

Thus, upon developing or producing the apparatus 10A, the track deviation of the recorded track is checked whether it is within the value specified in the standard if necessary as follows.

In a conventional measuring method and a device for measuring the track deviation, the magnetic tape on which recorded tracks are formed, is cut to a certain length, and the recorded tracks of the cut portion are developed by coating a magnetic powder thereon, resulting in a reveal of a track pattern of the recorded tracks because the recorded tracks attract the magnetic powder. Thus, it is possible for a calibration purpose to visually measure the track deviation of the recorded tracks by using a microscope with an X–Y table capable of moving in an X direction and in a Y direction of the cut tape.

However, in the conventional measuring method and device of the track deviation, there are problems that the recorded tape has to be cut and it is time consuming to measure. because of complicated measuring processes.

Further, as explained with FIG. 3, the ch-1 and ch-2 audio tracks TPe, TPf are formed in the deeper part of the magnetic layer under the ch-1 and ch-2 SP Mode video tracks TPa, TPb by using the ch-1 and ch-2 audio heads 34e, 34f. Thus, when the track deviations of both the ch-1 and ch-2 SP Mode video tracks TPa, TPb and the ch-1 and ch-2 audio tracks TPe, TPf are intended to be measured by the conventional measuring method, it is impossible to measure them separately because the track patterns revealing both the ch-1 and ch-2 SP Mode video track TPa, TPb and the ch-1 and ch-2 audio tracks TPe, TPf are superimposed.

SUMMARY OF THE INVENTION

Accordingly, a general object of the present invention is to provide a magnetic recording/reproducing apparatus, in which the above disadvantages have been eliminated.

A specific object of the present invention is to provide a magnetic recording/reproducing apparatus capable of performing an automatic and speedy measurement of its own track deviation generated in the apparatus by running a test magnetic tape formed with recorded tracks having almost no track deviation in the apparatus in the manufacturing factory.

An another and more specific object of the present invention is to provide a magnetic recording/reproducing apparatus constructed as such that a personal computer is electrically connected to the magnetic recording/reproducing apparatus through connectors, and that a track deviation caused by the apparatus is measured through the personal computer upon an operation by installing a test magnetic tape formed with recorded tracks having almost no track deviation in the apparatus so as to be helically wound in a predetermined angular range and direction around a rotary drum rotating together with magnetic heads of the apparatus, the magnetic recording/reproducing apparatus comprising: means for stepwise shifting the magnetic head in a longitudinal direction of the magnetic tape for causing magnetic head positions to displace stepwise and relatively with respect to the recorded tracks of the test magnetic tape along a track traversing line of the recorded tracks in response to a command directed from the personal computer; and means for outputting values of an FM signal measured at a plural measuring points predetermined on the test magnetic tape along a head scanning direction of the recorded tracks at every stepwise shifted magnetic head positions as the magnetic heads scanning the recorded tracks of the test magnetic tape, the values of the FM signal outputted being inputted to the personal computer for processing the values.

Other objects and further features of the present invention will be apparent from the following detailed description.

BRIEF DESCRIPTION OF THE DRAWINGS

FIGS. 8-(1) to 8-(9) are schematic views for explaining statuses that video FM signals vary when the rotary heads are stepwise shifted;

DETAILED DESCRIPTION OF THE PREFERRED EMBODIMENT

Figure 1:
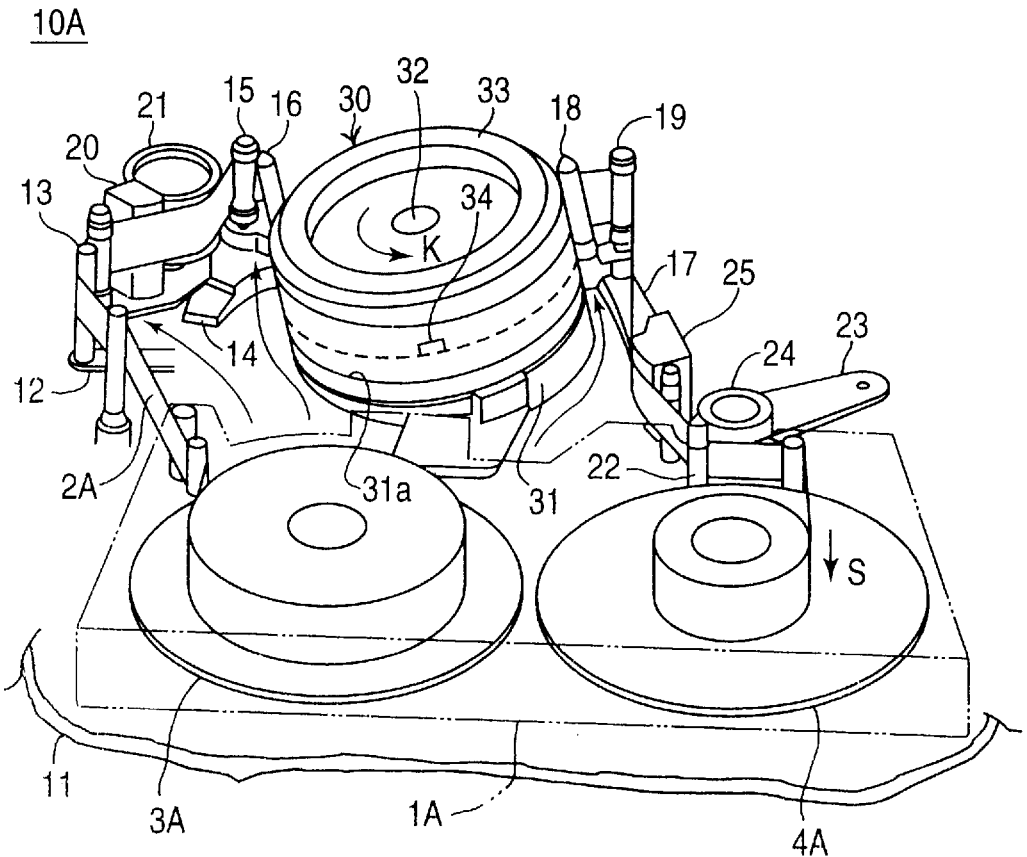
FIG. 1 is a perspective view of an ordinary magnetic recording/reproducing apparatus employing a helical scanning system in the prior art.

The present applicant proposed track deviation measuring method and track deviation measuring apparatus capable of measuring the track deviation of a track on the recorded tape by a non-destructive measuring method in the Japanese Patent Application 7-353509/1995.

In the track deviation measuring method and apparatus mentioned above, the track deviation of a track obliquely recorded in a predetermined direction on a magnetic tape by an ordinary recording/reproducing apparatus is measured through a personal computer by installing the recorded magnetic tape in a measuring magnetic recording/reproducing apparatus specifically preconditioned for virtual no track deviation.

However, the measuring magnetic recording/reproducing apparatus as such is needed to be prepared at every manufacturing factory. This poses a problem that it is time consuming to prepare a large number of the measuring magnetic recording/reproducing apparatus having high precision.

Description is now given of an embodiment according to the present invention referring to FIGS. 5 to 19, wherein the like reference characters as shown in FIGS. 1 to 4 denote like or corresponding parts throughout the drawings, and detailed descriptions of the like parts are omitted for simplicity except for new parts employed.

Figure 5:
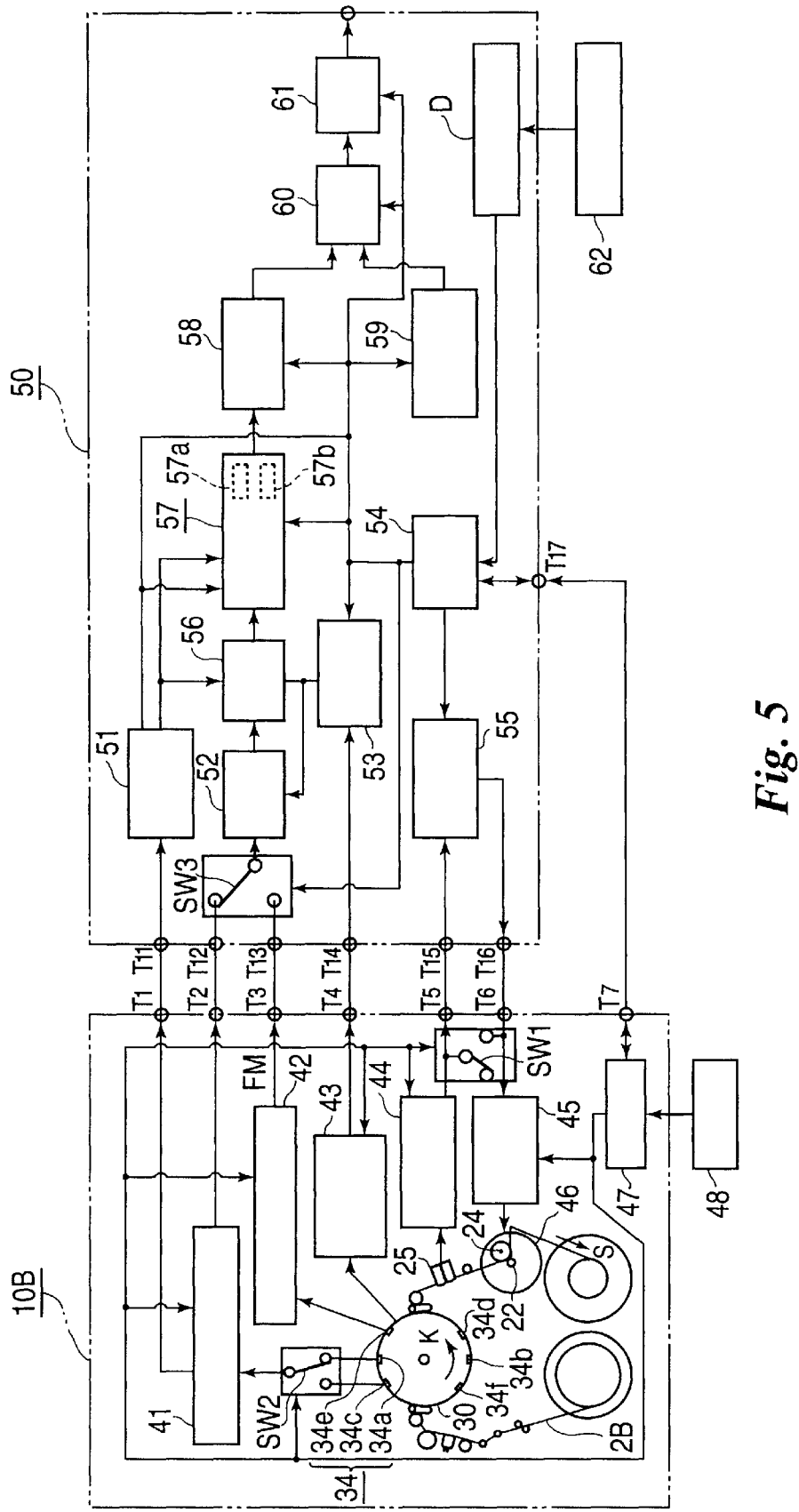
FIG. 5 is a block diagram for explaining a magnetic recording/reproducing apparatus and a personal computer of an embodiment of the present invention.
Figure 7:
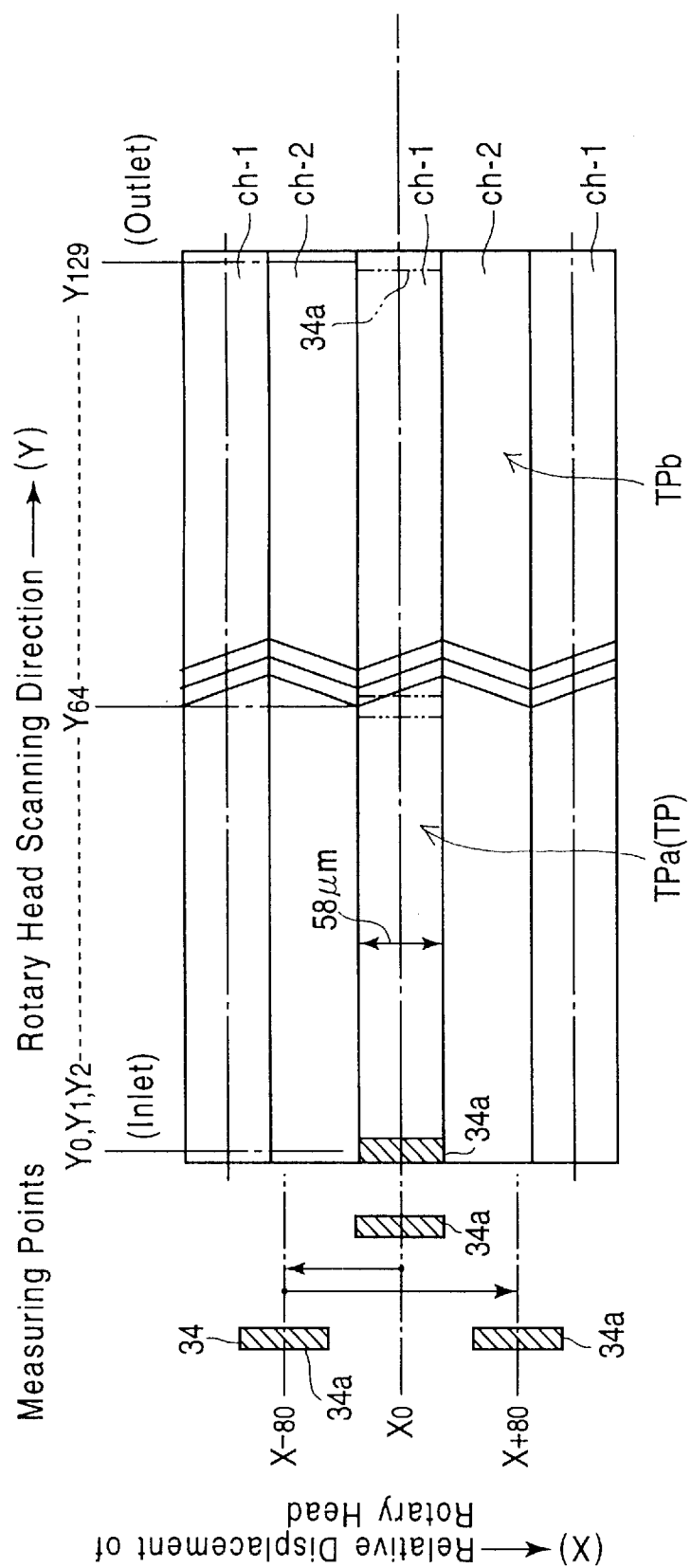
FIG. 7 is a schematic view for explaining an operation of a rotary head shifting mechanism which causes the rotary head to displace relatively perpendicular to the recorded tracks of a test magnetic tape and an operation of measuring video FM signals in the apparatus when the recorded tracks of the test magnetic tape are scanned with the rotary heads.
Figure 9:
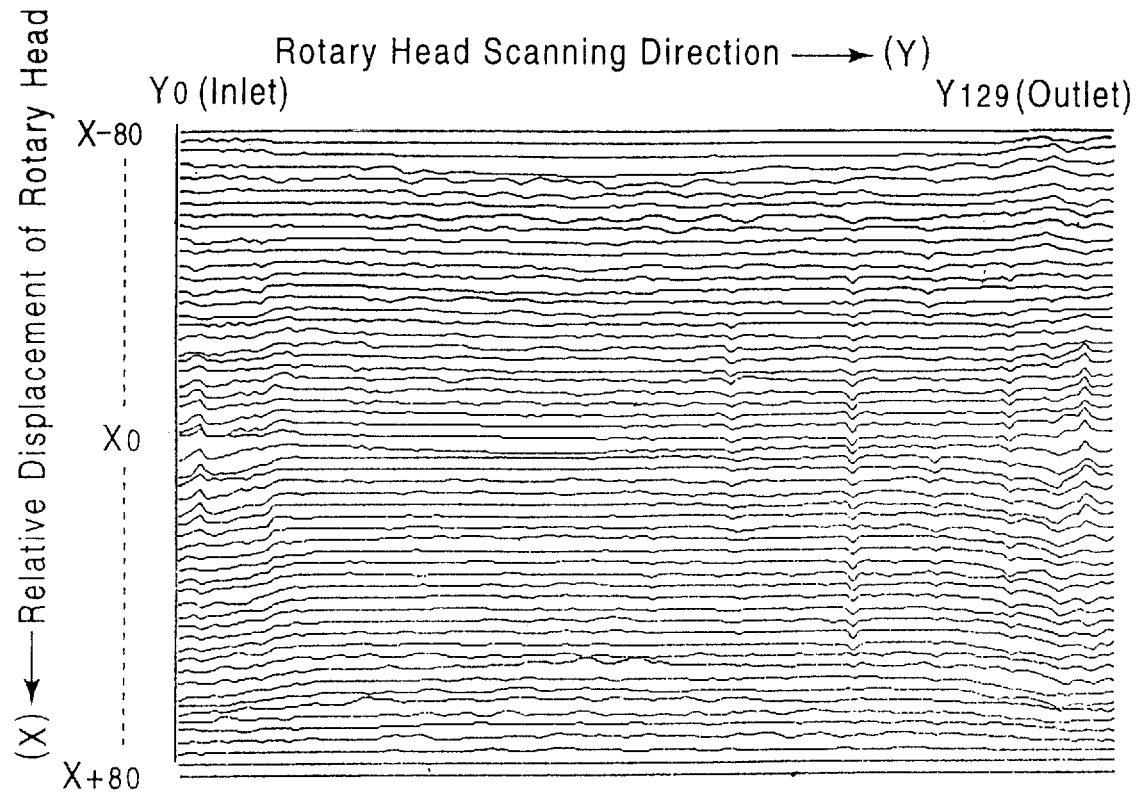
FIG. 9 is a chart for explaining output signals from an envelope detecting section.
Figure 10:
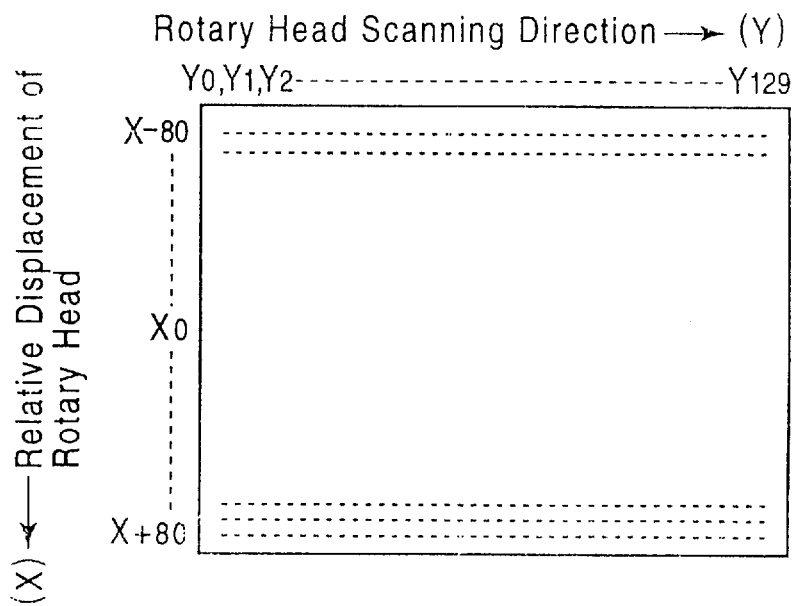
FIG. 10 is a schematic view for explaining digital data temporally stored in a track deviation data forming section in a personal computer.
Figure 11A:
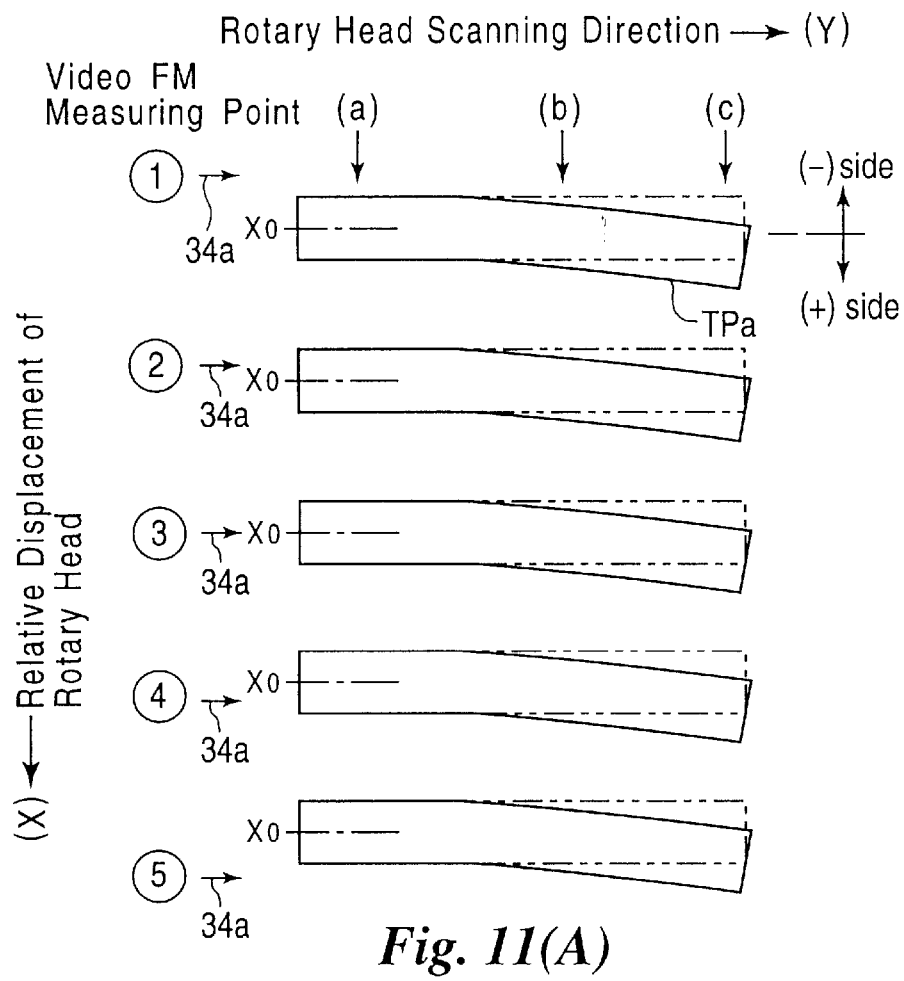
FIGS. 11(A) and 11(B) are schematic views for explaining a procedure for obtaining track deviation data of the recording/reproducing apparatus from recorded tracks formed on the test magnetic tape by running the test magnetic tape.
Figure 11B:
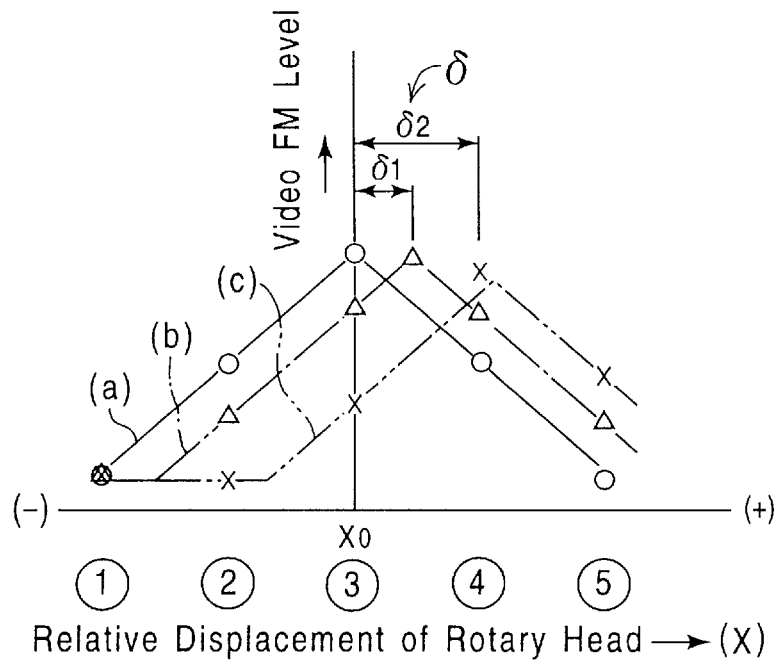
Figure 12A:
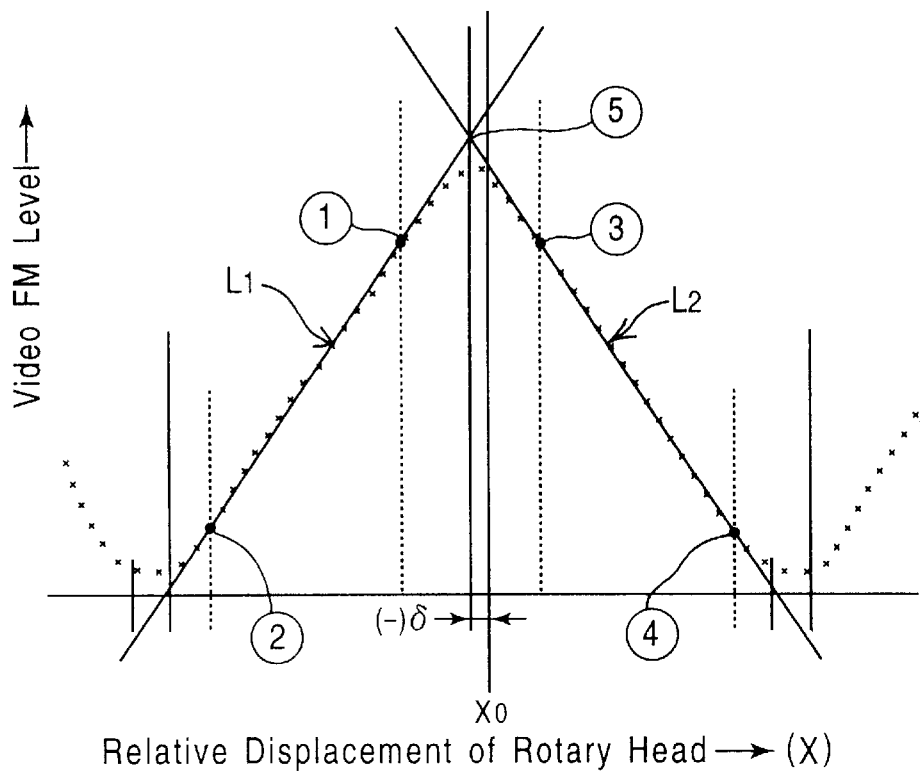
FIGS. 12(A) and 12(B) are schematic views for explaining a procedure for obtaining track deviation data of the recording/reproducing apparatus from the recorded tracks formed on the test magnetic tape by running the test magnetic tape.
Figure 12B:
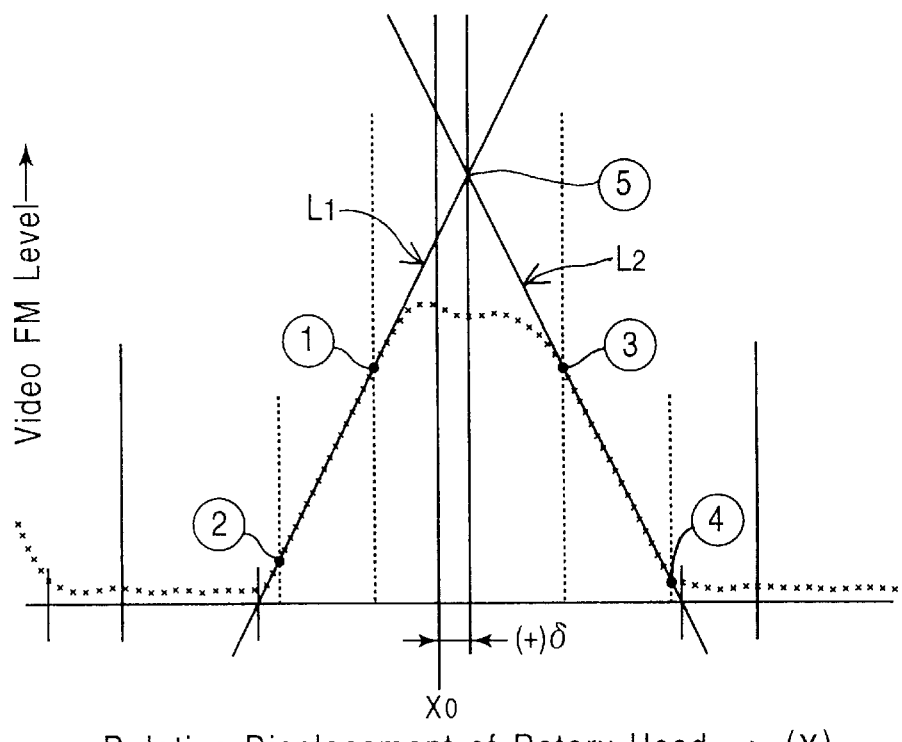
Figure 13A:
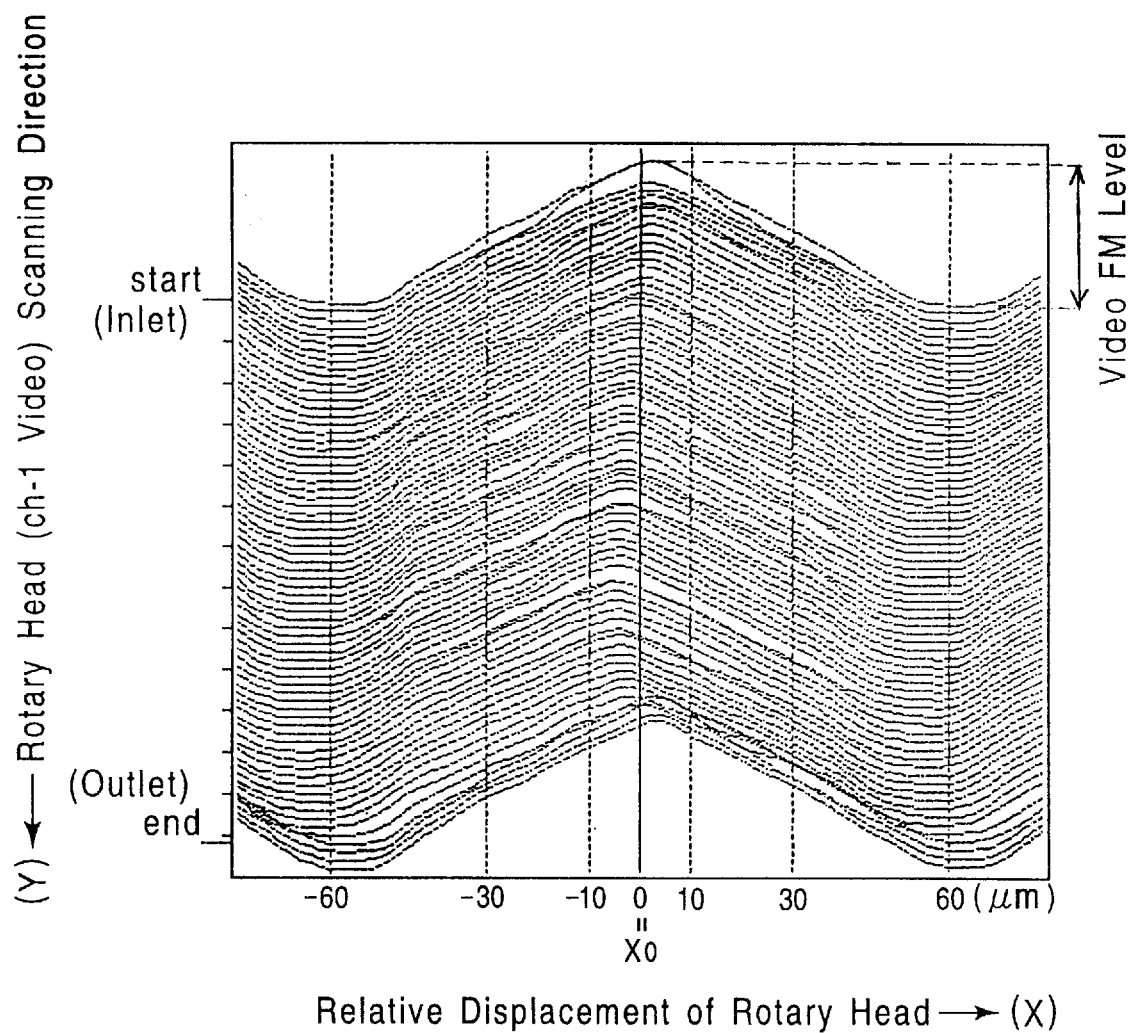
FIGS. 13(A) and 13(B) are resultant charts obtained, each exhibiting data of ternary track deviation of the recording/reproducing apparatus to be measured when the the test magnetic tape is operated by the apparatus.
Figure 13B:
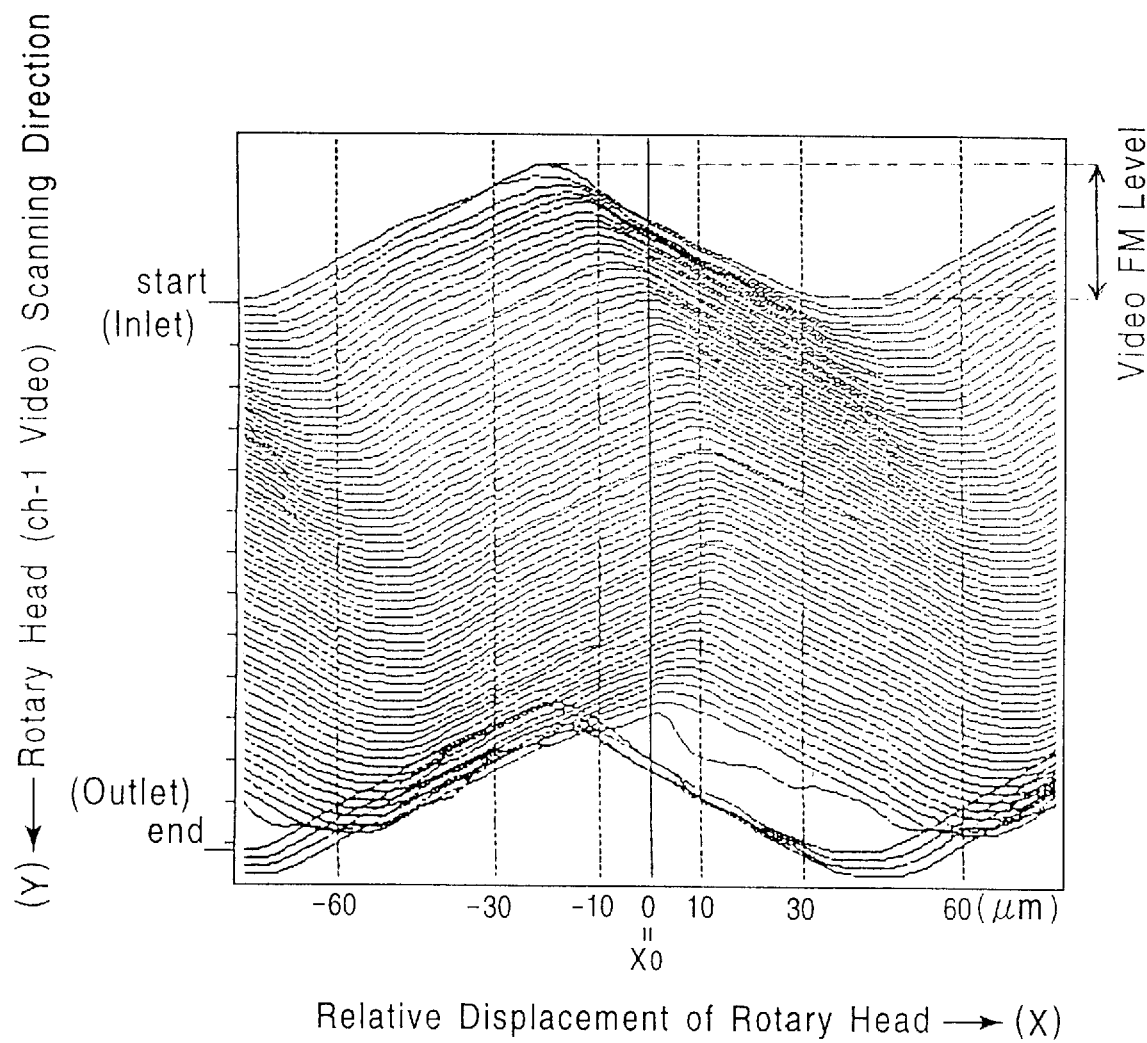
Figure 14A:
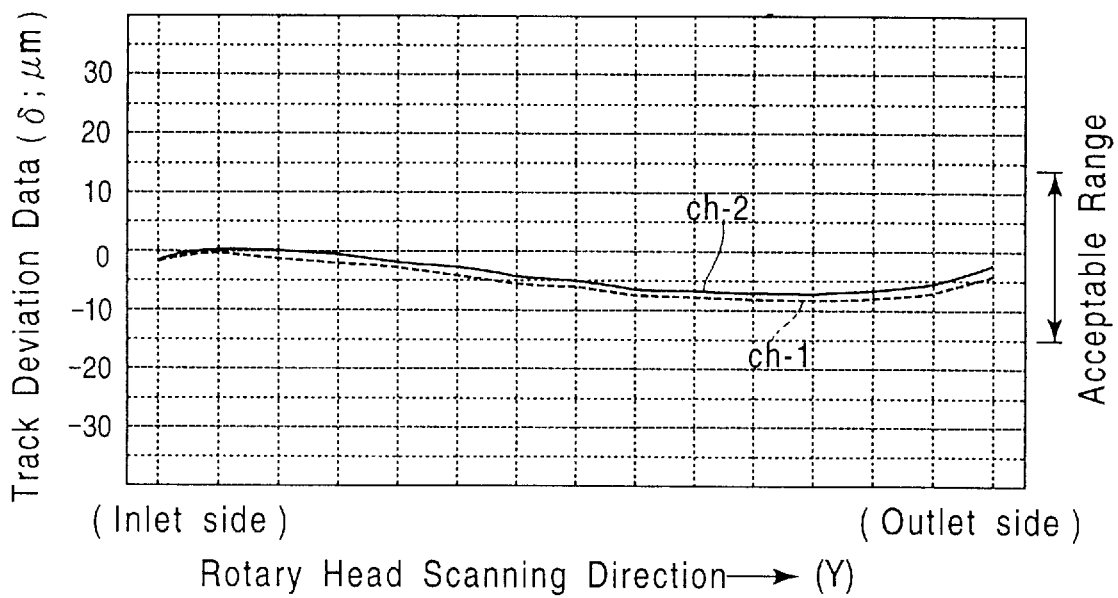
FIGS. 14(A) and 14(B) are graphs, each exhibiting data of track deviation of the recording/reproducing apparatus to be measured when the test magnetic tape is operated.
Figure 14B:
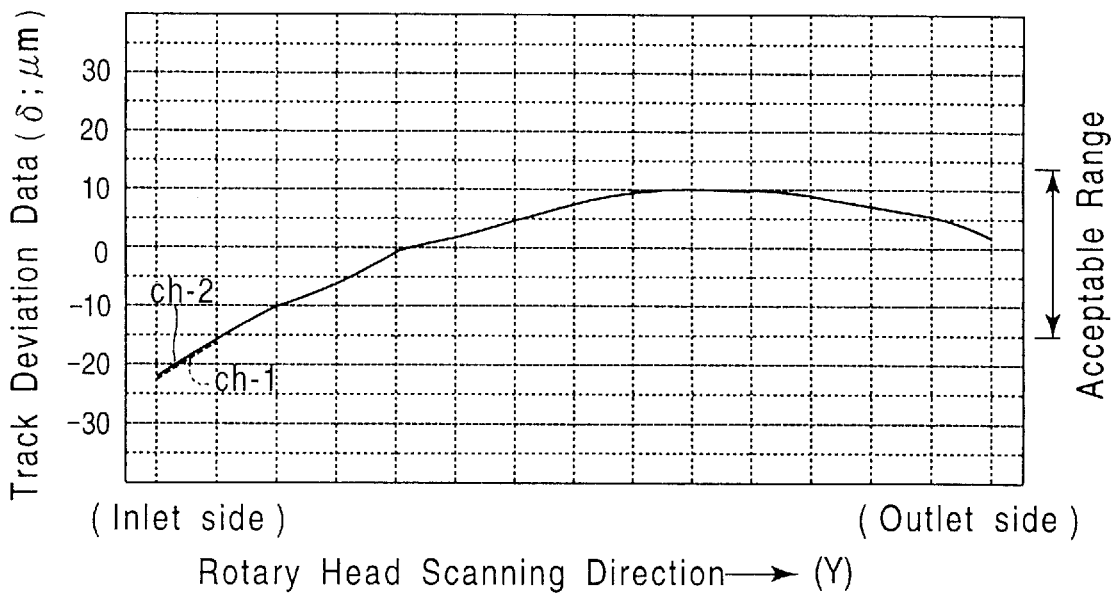
Figure 15:
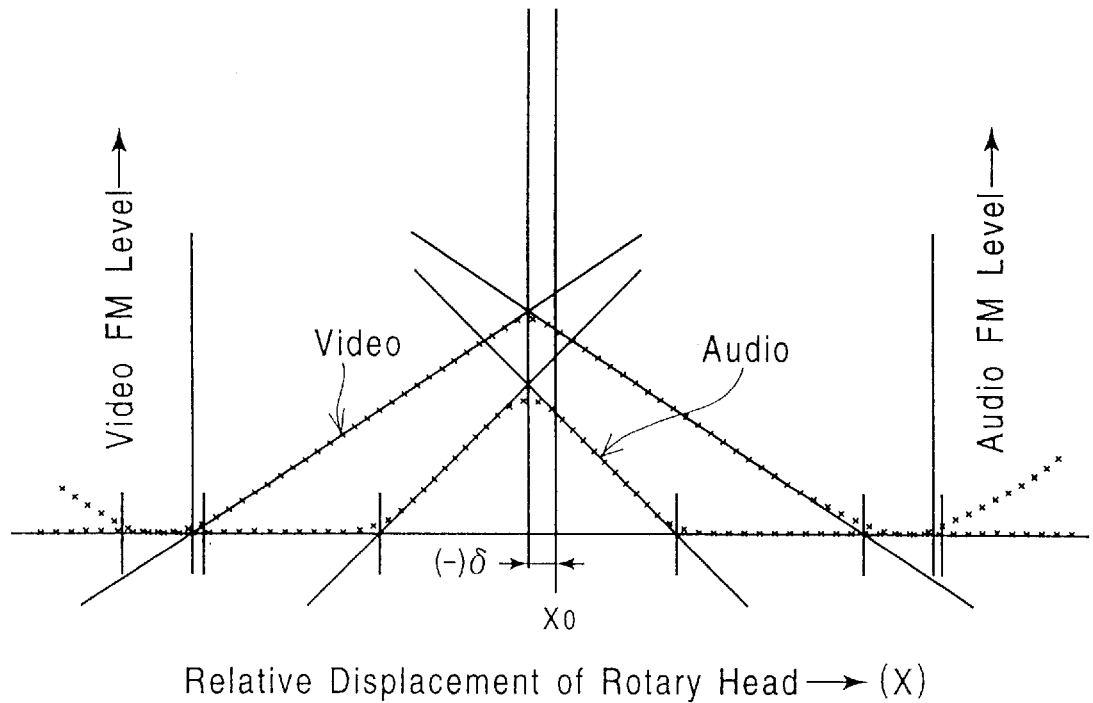
FIG. 15 is a chart for explaining a procedure to obtain track deviation data of the video tracks and the audio tracks formed in the deeper part of the magnetic layer of the test magnetic tape at the same time when the test magnetic tape is operated by the apparatus to be measured.
Figure 16A:
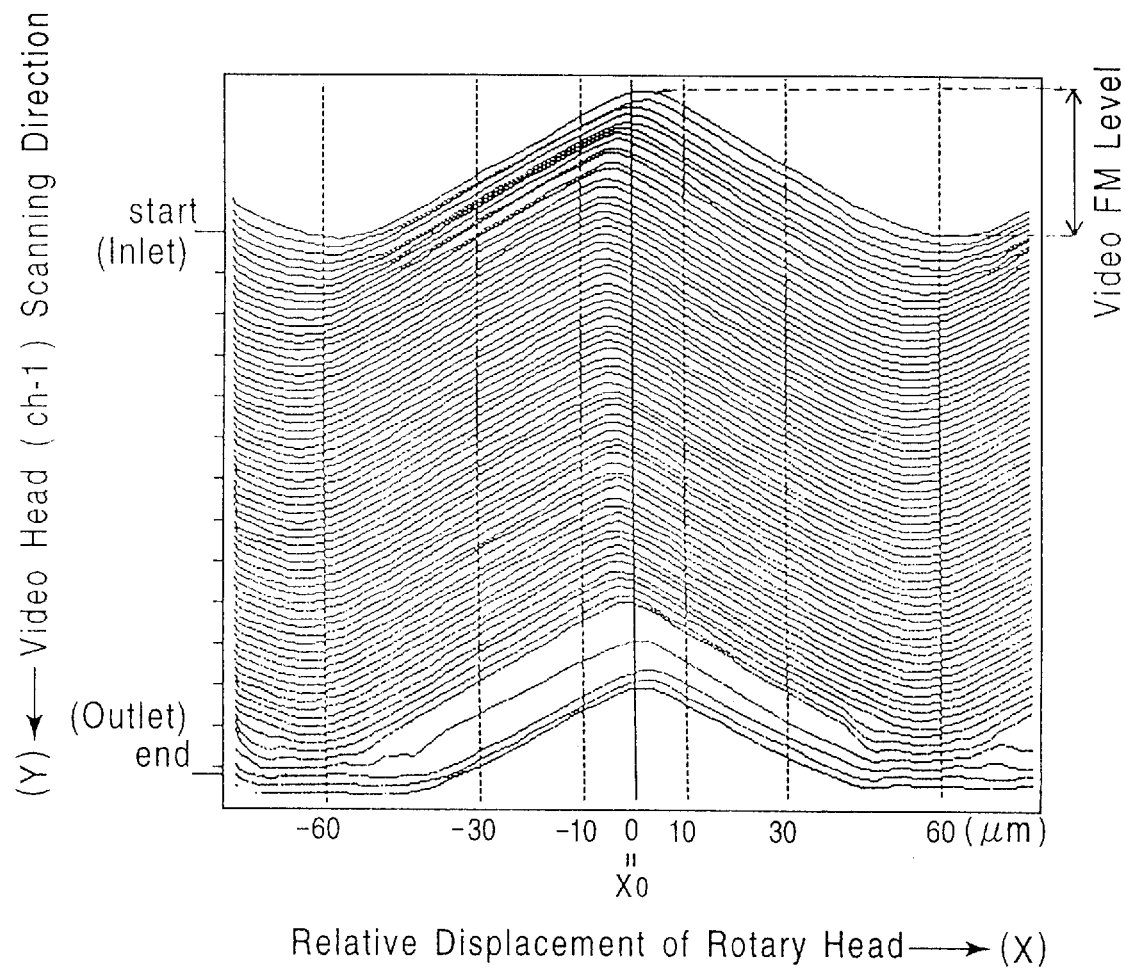
FIGS. 16(A) and 16(B) are resultant charts when track deviation data of the video tracks and the audio tracks are obtained at the same time, wherein each of them displays ternary data of track deviation of the apparatus to be measured when the test magnetic tape is operated by the apparatus.
Figure 16B:
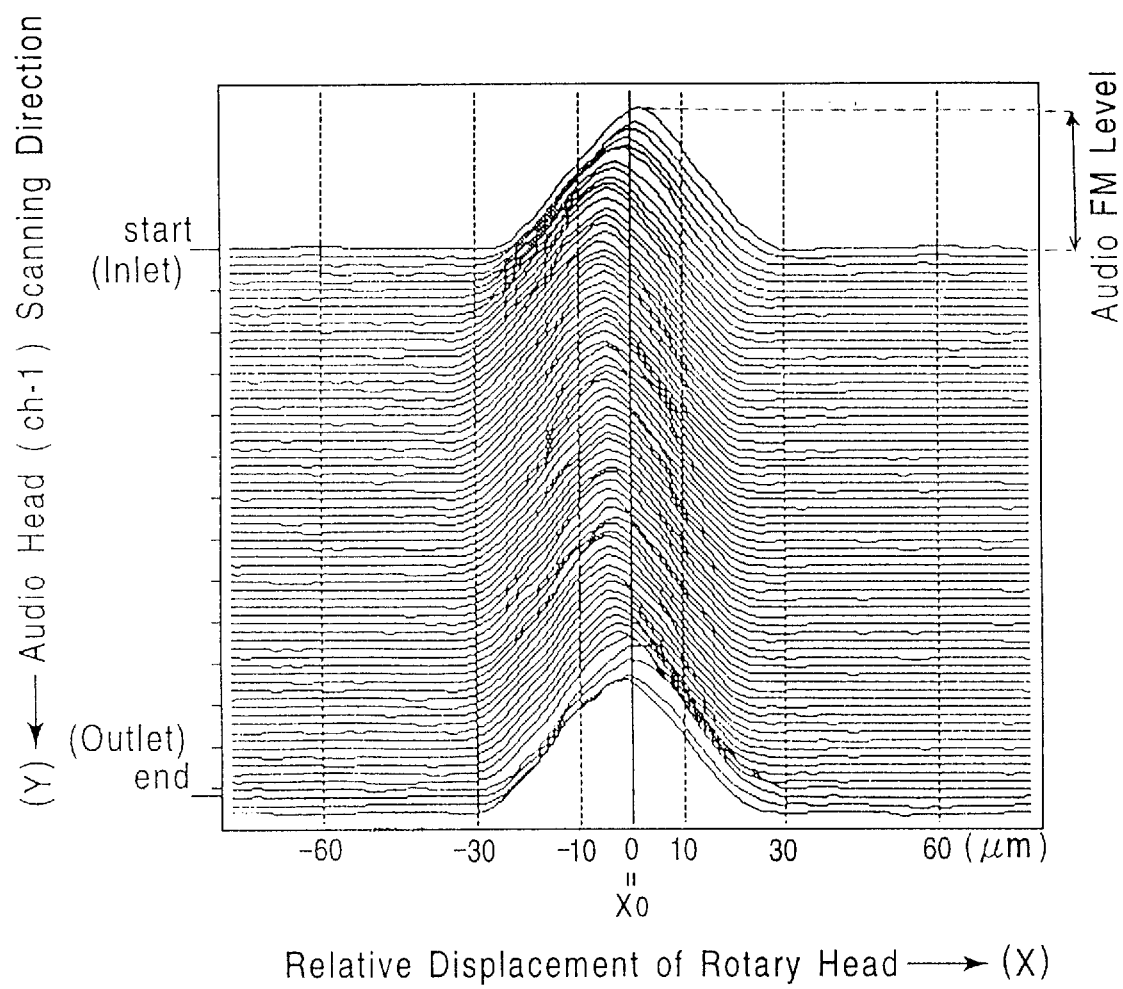

FIG. 5 is a block diagram for explaining a magnetic recording/reproducing apparatus and a personal computer of an embodiment of the present invention;

FIGS. 6(A) to 6(I) show waveforms of various kinds of signals used in the magnetic recording/reproducing apparatus and the personal computer shown in FIG. 5;

FIG. 7 is a schematic view for explaining an operation of a rotary head shifting mechanism which causes the rotary head to displace relatively perpendicular to the recorded tracks and an operation of measuring video FM signals in the apparatus when the recorded tracks are scanned with the rotary heads;

FIGS. 8-(1) to 8-(9) are schematic views for explaining statuses that video FM signals vary when the rotary heads are stepwise shifted;

FIG. 9 is a chart for explaining output signals from an envelope detecting section;

FIG. 10 is a schematic view for explaining digital data temporally stored in a track deviation data forming section in a personal computer;

FIGS. 11(A) and 11(B) are schematic views for explaining a procedure for obtaining track deviation data of the recording/reproducing apparatus from recorded tracks formed on the test magnetic tape by running the test magnetic tape;

FIGS. 12(A) and 12(B) are schematic views for explaining a procedure for obtaining track deviation data of the recording/reproducing apparatus from the recorded tracks formed on the test magnetic tape by running the test magnetic tape;

FIGS. 13(A) and 13(B) are resultant charts obtained, each exhibiting data of ternary track deviation of the recording/reproducing apparatus to be measured when the the test magnetic tape is operated by the apparatus;

FIGS. 14(A) and 14(B) are graphs, each exhibiting data of track deviation of the recording/reproducing apparatus to be measured when the test magnetic tape is operated;

FIG. 15 is a chart for explaining a procedure to obtain track deviation data of the video tracks and the audio tracks formed in the deeper part of the magnetic layer of the test magnetic tape at the same time when the test magnetic tape is operated by the apparatus to be measured;

FIGS. 16(A) and 16(B) are resultant charts when track deviation data of the video tracks and the audio tracks are obtained at the same time, wherein each of them displays ternary data of track deviation of the apparatus to be measured when the test magnetic tape is operated by the apparatus.

Figure 17:
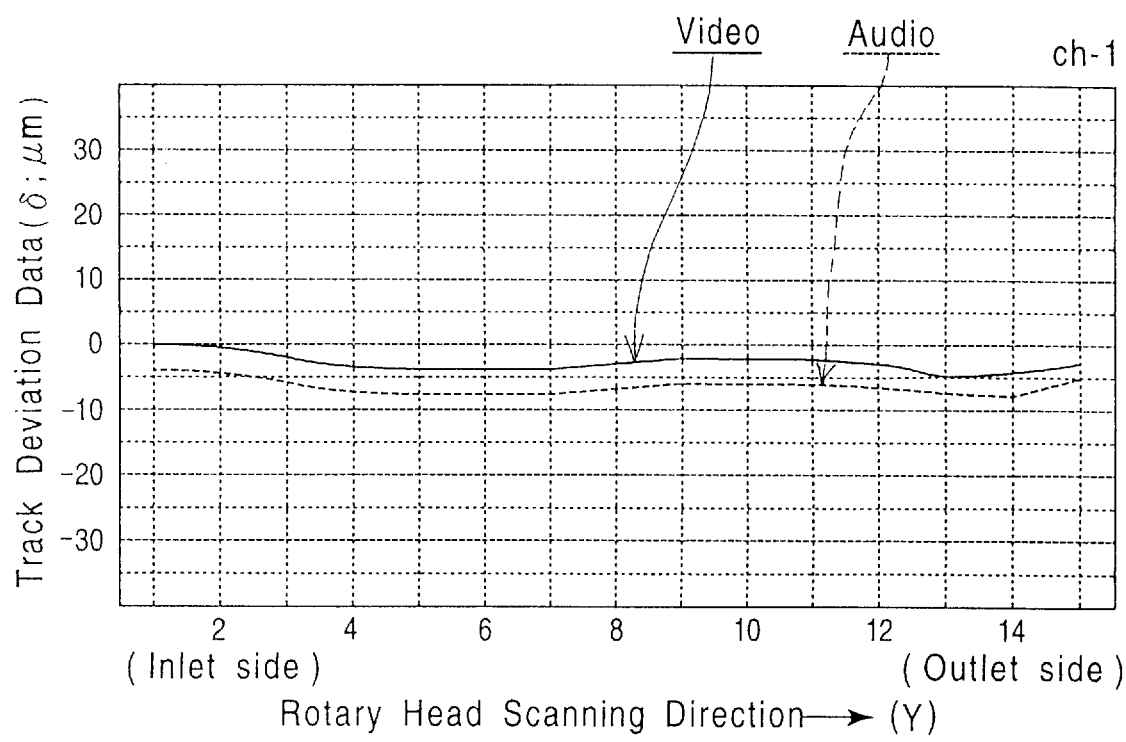
FIG. 17 is a resultant graph obtained when track deviation data of the video tracks and the audio tracks are obtained at the same time, wherein respective curves display data of track deviation of the apparatus to be measured form the test magnetic tape with respect to the video tracks and the inner audio tracks.
Figure 18:
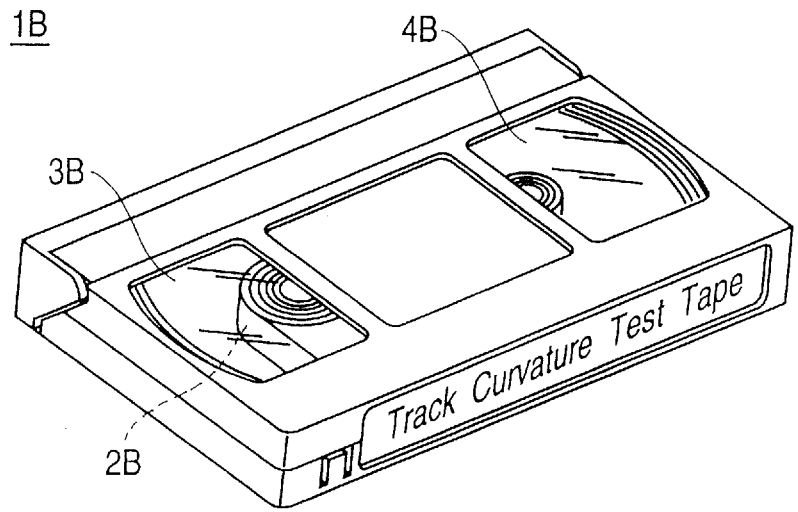
FIG. 18 is a perspective view showing a test tape cassette in which a test magnetic tape formed with a recorded tape pattern having almost no track deviation is accommodated.
Figure 19:
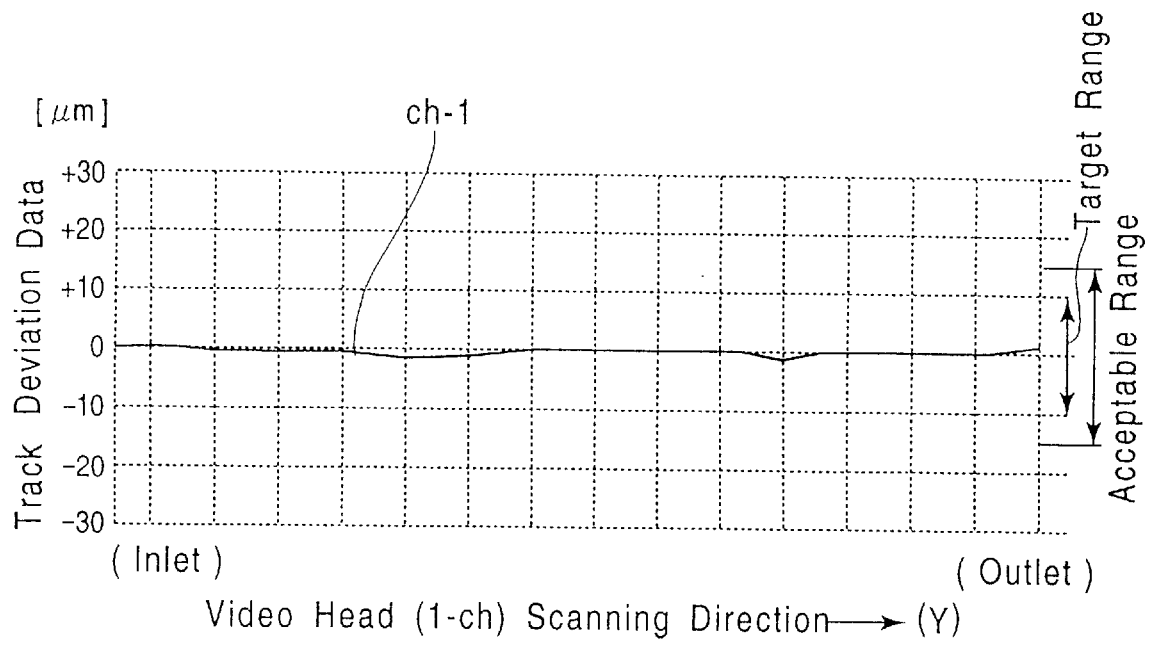
FIG. 19 is a graph showing track deviation data of the test magnetic tape shown in FIG. 18, wherein the data of a ch-1 video track is represented

FIG. 17 is a resultant graph obtained when track deviation data of the video tracks and the audio tracks are obtained at the same time, wherein respective curves display data of track deviation of the apparatus to be measured form the test magnetic tape with respect to the video tracks and the inner audio tracks;

FIG. 18 is a perspective view showing a test tape cassette in which a test magnetic tape formed with a recorded tape pattern having almost no track deviation is accommodated; and FIG. 19 is a graph showing track deviation data of the test magnetic tape shown in FIG. 18, wherein the data of a ch-1 video track is represented.

Prior to the explanation of the arrangement of a magnetic recording/reproducing apparatus 10B and a personal computer 50 of the present invention shown in shown in FIG. 5, the description is given of a standard magnetic tape (referred to as a test magnetic tape hereinafter) 2B for measuring the track deviation of the apparatus 10B in the embodiment of the present invention referring to FIGS. 18 and 19.

As shown in FIG. 18, the test magnetic tape 2B, of which ends are respectively wound around a supply reel 3B and a take-up reel 4B, is accommodated in a standard tape cassette 1B for measuring the track deviation of the apparatus 10B. On the test magnetic tape 2B, recorded tracks having almost no track deviation are obliquely formed in a predetermined direction.

The test magnetic tape 2B is pre-recorded by using a magnetic recording/reproducing apparatus (not shown) free from the track deviation conforming to the previously mentioned industry standard.

Further, as shown in FIG. 19, the track deviation value of the test magnetic tape 2B is well controlled to be less than ±1.5 μm in the SP Mode recorded track. This value is much less compared with the acceptable range specified in the industry standard and with the target value mentioned in the foregoing.

In the EP Mode and audio recorded tracks, the track deviation value of the test magnetic tape 2B is well controlled to be less than ±1.5 μm as well.

Thus, it will be understood that when this test magnetic tape 2B is reproduced on the magnetic recording/reproducing apparatus 10B which is to be evaluated, its track deviation exhibits the track deviation caused by the apparatus 10B to be evaluated and the track deviation is measured by a nondestructive method without cutting the test magnetic tape 2B.

Accordingly, the description is given based on a fact that the test magnetic tape 2B itself has virtually no track deviation but a magnetic recording/reproducing apparatus to be evaluated has a possibility of causing a track deviation or a disagreement between its head locus and its scanning track of the test magnetic tape 2B as a track scanning error.

In the embodiment of the present invention shown in FIG. 5, the magnetic recording/reproducing apparatus 10B to be evaluated is electrically connected to the personal computer 50 through the connectors T1 to T7 and T11 to T17. And, the test magnetic tape 2B on which obliquely recorded tracks are formed, is helically wound around the rotary drum 30 at a predetermined angular range in the apparatus 10B and is driven by being pinched between a pinch-roller 24 and a capstan 22 in the direction of the arrow S, while rotary heads 34 provided on the rotary drum 30 are rotated together with the rotary drum 30 in the direction of the arrow K. In this state, by controlling a capstan rotation momentarily, positions of the rotary heads 34 relative to the recorded tracks are displaced in a longitudinal direction of the test magnetic tape 2B. This causes the rotary head 34 to move across the recorded track vertically. At every stepwise displacement the rotary heads 34, a variation of envelope of an FM output signal caused by a gnal caused by a disagreement between the head scanning locus and the canned track, a head scanning locus nonlinearity of the magnetic recording/reproducing apparatus 10B is measured. After that, digital data obtained from the envelopes of the FM output signals are processed by the personal computer 50, resulting in track deviation data caused by the magnetic recording/reproducing apparatus 10B.

The magnetic recording/reproducing apparatus 10B of the present invention may be one of commercial products equipped with such capability of connecting with the computer 50.

Specifically, referring to FIG. 5, the test magnetic tape 2B having virtually no track deviation is installed in the magnetic recording/reproducing apparatus 10B. The tape running system of the apparatus 10B is the same as that of the ordinary magnetic recording/reproducing apparatus 10A (FIG. 1). Thus, like parts or corresponding parts are designated with like reference characters, and the detailed explanation thereof is omitted here.

In this embodiment, the magnetic recording/reproducing apparatus 10B and the personal computer 50 are electrically connected through connector cables. Upon manipulation of a keyboard 62 of the personal computer 50 to start measuring the track deviations, an initial statement of "Start of Measuring" is displayed on a display panel (not shown) of the personal computer 50.

Further, a prompt to operate a start button on a control board 48 of the magnetic recording/reproducing apparatus 10B is displayed on the display panel thereof. Upon pressing the start button, in the apparatus 10B, a control pulse processing section 44 mentioned hereinafter is electrically disconnected from a capstan servo section 45 by opening a switch SW1, and a conventional auto-tracking system is disabled and a capstan servo section 45 becomes under control of the personal computer 50. Thus, the magnetic recording/reproducing apparatus 10B together with the personal computer 50 is conditioned to conduct the measurement. Further, when the control pulse processing section 44 is connected with the capstan servo section 45 through the switch SW1 without operating the control board 48, the apparatus becomes in a non-measureing mode, resulting in the normal recording/reproducing state where the auto-tracking system is operable.

Further, by a manipulation of the keyboard 62, it is possible to operate both a first control section 54 of the personal computer 50 in accordance with a measuring program stored in a recording medium D accommodated in the personal computer 50, and a second control section 47 of the apparatus 10B which is electrically connected with the first control section 54 through connectors T17, T7 for accepting control signals from the first control section 54. As the recording medium D, it is possible to use a well known magnetic disc or an optical disc. According to the measuring program, the first controlling section 54 which may be realized by an MPU, controls operation of all the hardware within the personal computer 50 and the apparatus 10B.

Figure 3:
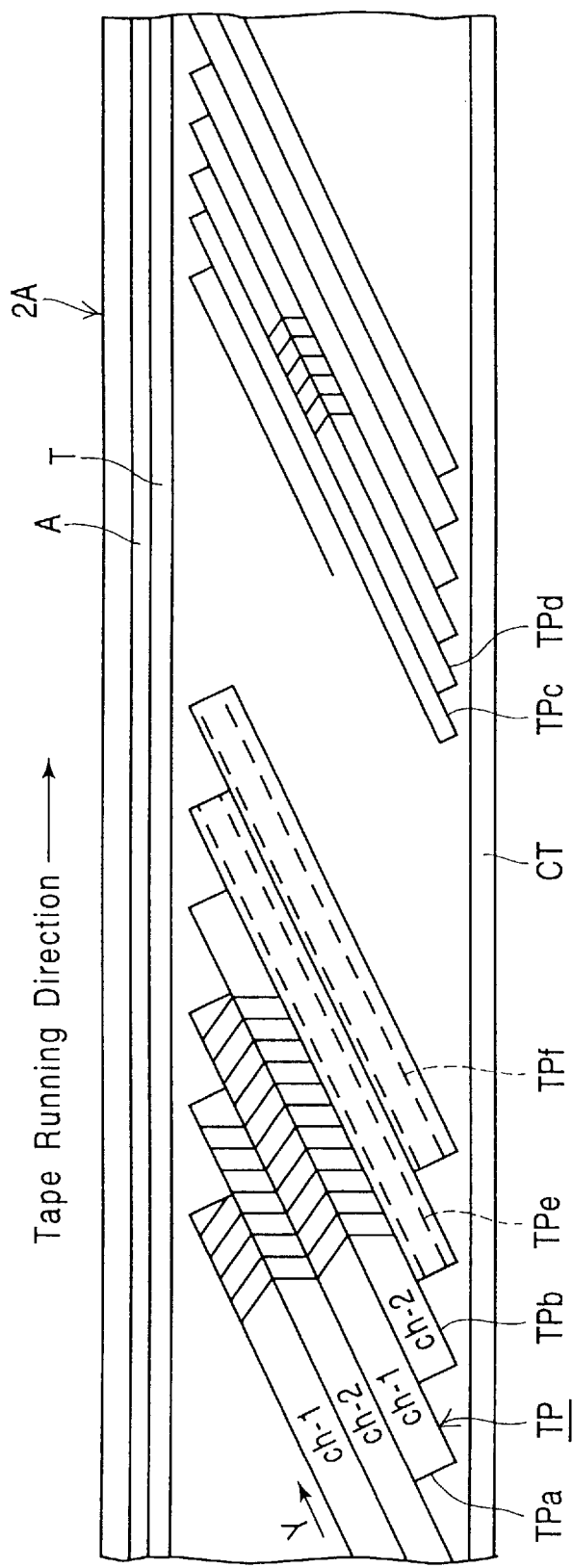
FIG. 3 is a plan view showing a tape pattern having a plurality of recorded tracks formed on a magnetic tape by using the ordinary magnetic recording/reproducing apparatus.
Figure 4:
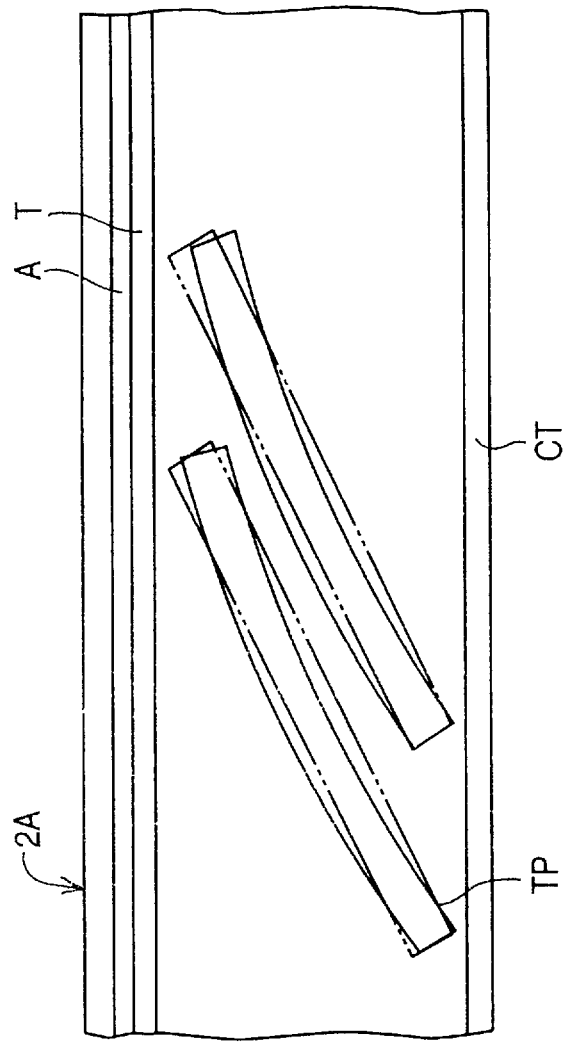
FIG. 4 is a plan view showing track deviations of the recorded tracks on a magnetic tape by using the magnetic recording/reproducing apparatus in the prior art.

Here, the rotary heads 34 provided on the rotary drum 30 are rotated in a direction of an arrow K, and the test magnetic tape 2B is driven in a direction of an arrow S by being pinched between the capstan 22 and the pinch-roller 24. The plurality of rotary heads 34 (34a to 34f) reproduces the signals recorded on the recorded tracks TP (TPa to TPf) of the magnetic tape 2B as shown in FIG. 3 by scanning the recorded tracks TP in a direction of an arrow "Y" which is determined by a running direction of the rotary heads 34 and a relative speed between the magnetic tape 2B and the rotary drum 30. Thus, output signals from the ch-1 and ch-2 SP Mode video heads 34a, 34b or from the ch-1 and ch-2 EP Mode video heads 34c, 34d are transmitted to a video signal processing section 41, and output signals from the ch-1 and ch-2 audio heads 34e, 34f are transmitted to an audio signal processing section 42.

In this case, the ch-1 and ch-2 SP Mode video heads 34a, 34b and the ch-1 and ch-2 EP Mode video heads 34c, 34d are connected to the video signal processing section 41 through a switch SW2. Thus, the measuring modes of the track deviations regarding the ch-1 and ch-2 SP Mode video tracks TPa, TPb and the ch-1 and the ch-2 EP Mode video tracks TPc, TPd, which are to be measured and are respectively recorded by the ch-1 and ch-2 SP Mode video heads and the ch-1 and ch-2 EP Mode video heads by other recording apparatus are selectively switched based on the command from the keyboard 62 of the personal computer 50 through the second control section 47. Incidentally, the switch SW2 is controlled by the second control section 47 and is positioned depending on a selected mode of SP or EP. The switch SW2 is normally placed on the SP Mode side. And the second control section 47 is a conventional operation controller in a form of microprocessor (MPU) which normally built into the magnetic recording/reproducing apparatuses such as the one denoted as 10B. And in the present invention, the apparatus 10B is modified from conventional magnetic recording/reproducing apparatus, and the second control section 47 thereof is utilized to interface with the personal computer 50, so that the computer 50 can operate various parts of the apparatus 10B therethrough.

FIG. 6(A) shows H-sync pulses used in the embodiment of the present invention; and FIG. 6(B) shows sampling pulses obtained from the H-sync pulses shown in FIG. 6(A).

As shown in FIG. 6(A), the video signal processing section 41 provides horizontal synchronizing pulses (referred to as H-sync pulses hereinafter) of 525/2 (262.5) to a sampling pulse generating section 51 of the personal computer 50 through connectors T1, T11 by processing a 1-field (1 V) period video signal reproduced from each of the recorded tracks TP (TPa, TPb) by the rotary heads 34 during ½ rotation of the rotary heads 34 (1-field scanning). And, as shown in FIG. 6(B), the sampling pulse generating section 51 generates sampling pulses of 130 by frequency-dividing the H-sync pulses of 262.5 into about a half thereof.

On measuring the deviations of the recorded tracks TP, amplitude values of FM envelopes of the recorded tracks TP are measured by scanning them with the rotary heads 34 for video and audio signals on the recorded tracks TP. The above sampling pulses are used for determing measuring points on the FM envelopes when the rotary heads 34 scans the tracks from tape inlets to outlets of the rotary drum 30.

FIG. 6(C) shows a 1-field (1 V) period video FM signal or a 1-field (1 V) period audio FM signal in the embodiment of the present invention.

Further, the video signal processing section 41 provides a 1-field (1 V) period video FM signal shown in FIG. 6(C) which is reproduced from the recorded tracks TP (TPa, TPb), (TPc, TPd) by the rotary heads 34 (34a, 34b), (34c, 34d), to the personal computer 50 through connectors T2, T12.

Figure 6:
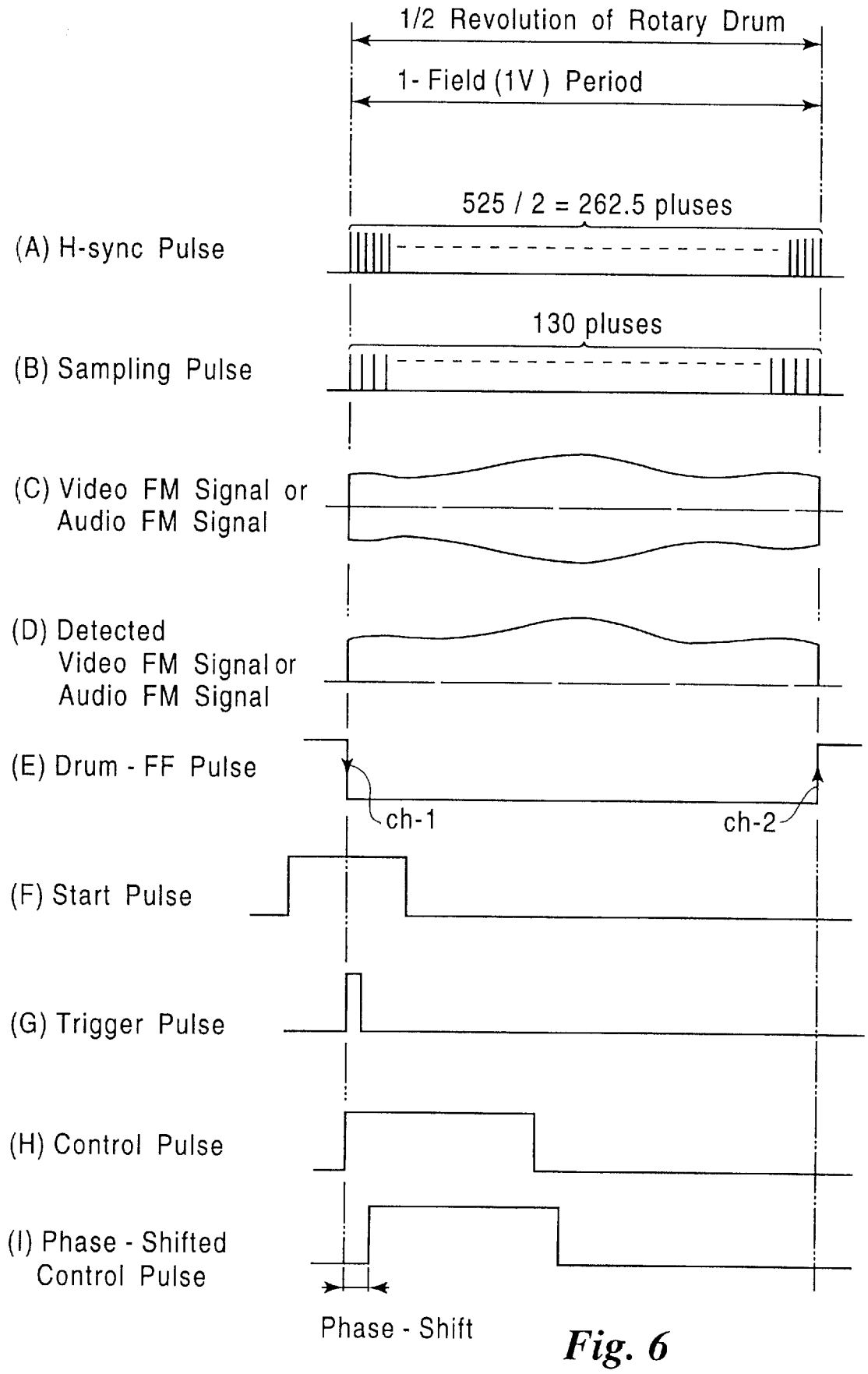
FIGS. 6(A) to 6(I) show waveforms of various kinds of signals used in the magnetic recording/reproducing apparatus shown in FIG. 5.

On the other hand, the audio signal processing section 42 provides a 1-field (1 V) period audio FM signal (FIG. 6 (C)) produced from the recorded tracks TP (TPe, TPf) by the rotary heads 34 (34e, 34f) to the personal computer 50 through connectors T3, T13.

In the personal computer 50, both the video FM signal and the audio FM signal respectively fed to connectors T12, T13 are supplied to an envelop detecting section 52 through a switch SW3.

The switch SW3 can be selectively placed either on the connector T12 side or on the connector T13 side based on the command from the keyboard 62 of the personal computer 50 through the first control section 54. When the track deviations of the recorded tracks TP (TPa, TPb), (TPc, TPd) for the video signal are measured, the switch SW3 is placed on the connector T12 side, and when the track deviations of the recorded tracks TP (TPe, TPf) for the audio signal are measured, the switch SW3 is placed on the connector T13 side. Further, when both the track deviations of the recorded tracks TP (TPa, TPb) or (TPc, TPd) for the video signals and those of the recorded tracks TP(TPe, TPf) for the audio signal are measured, the switch SW3 is alternately changed by the first control section 54 on the basis of a time division method. Incidentally, the switch SW3 is normally placed on the video FM signal side.

FIG. 6(D) shows an envelope detected signal obtained from the 1-field (1 V) period video FM signal or the 1-field (1 V) period audio FM signal shown in FIG. 6(C).

The envelope detecting section 52 performs an envelope detection of the video FM signal or the audio FM signal, and outputs an envelope detected signal shown in FIG. 6(D) obtained from the video FM signal or the audio FM signal to an A/D converting section 56.

FIG. 6(E) shows drum-FF pulses generated from a rotary drum driving section 43 in the embodiment.

Next, the rotary drum 30 is rotated by the rotary drum driving section 43, and the rotary drum driving section 43 outputs one flip flop pulse (referred to as drum-FF pulse hereinafter) per one revolution of the rotary drum 30 to a trigger pulse generating section 53 provided in the personal computer 50 through connectors T4, T14 corresponding to the 1-field (1 V) of the video FM signal or the audio FM signal as shown in FIG. 6(E).

This drum-FF pulse is to be used as a standard pulse for controlling the personal computer 50 in synchronization with the operation of the magnetic recording/reproducing apparatus 10B. During one revolution of the rotary drum 30, the rotary drum driving section 43 alternately outputs an H (high) level and an L (low) level of the drum-FF pulse at every half drum rotation. Here, for instance, a falling edge of the drum-FF pulse is utilized to set up a standard signal for measuring the track deviations of channel-1 of the rotary heads 34 (34a, 34c, 34e). On the other hand, a rising edge of the drum-FF pulse is utilized to set up the standard signal for that of channel-2 of the rotary heads 34 (34b, 34d, 34f).

In this case, the selection of a specified channel of the rotary heads 34 is determined by the command from the keyboard 62 of the personal computer 50. After the selection of the channel, the measurement of the track deviation is performed depending on the measurement program installed in the recording medium "D".

FIG. 6(F) shows a start pulse generated by a first control section 54 in the embodiment; and FIG. 6(G) shows a trigger pulse generated by the trigger pulse generation section 53 in the embodiment.

Responsive to a start pulse shown in FIG. 6(F) outputted from the first control section 54, the trigger pulse generating section 53 generates a trigger pulse shown in FIG. 6(G) corresponding to the falling edge of the drum-FF pulse to allow the channel-1 of the rotary heads 34 (34a, 34c, 34e) to measure the track deviation of the ch-1 recorded tracks TP (TPa, TPc, TPe), wherein the trigger pulse is generated only one pulse.

In the same manner as mentioned above, the trigger pulse for measuring the track deviation of the ch-2 recorded tracks TP (TPb, TPd, TPf) is generated corresponding to the rising edges of the drum-FF pulses to allow the channel-2 of the rotary heads 34 (34b, 34d, 34f) to measure the track deviation of the ch-2 recorded tracks TP (TPb, TPd, TPf).

FIG. 6(H) shows a control pulse reproduced from a control track in the embodiment; and FIG. 6(I) shows a phase-shifted control pulse obtained from the control pulse shown in FIG. 6(H) by being phase-shifted.

Next, the AC head 25 reproduces audio signals and a control signal from the audio tracks A and T at a top edge of the test magnetic tape 2B in the same manner as mentioned in FIG. 3 and the control track CT at a lower edge thereof. When the control signal is reproduced by the AC head 25, one control pulse is outputted during 1-frame (2-fields) period through the control pulse processing section 44, and the control pulse is inputted to a control pulse phase-shifting section 55 of the personal computer 50 through connectors T5, T15.

And, as shown in FIG. 6(I), the control pulse phase-shifting section 55 shifts the phase of the control pulse corresponding to a predetermined shift value for the rotary heads 34 which value is directed by the first control section 54 as will be explained hereinafter. The phase-shifted control pulse is inputted to the capstan servo section 45 of the magnetic recording/reproducing apparatus 10B through connectors T6, T16.

Incidentally, when no measurements are conducted, the control pulse from the control pulse processing section 44 is directly inputted to the capstan servo section 45 through the switch SW1, resulting in the normal recording/reproduction.

The capstan servo section 45 inputs the phase-shifted control pulse to a capstan motor 46 for driving the capstan 22. Here, a rotational speed of the capstan 22 is slightly shifted through the capstan motor 46 because of the phase-shifted control pulse. Thus, the tape speed of the test magnetic tape 2B pinched between the capstan 22 and the pinch roller 24 is slightly changed as well. Thereby, a positional relation between the magnetic tape and the rotary heads 34 provided on the upper rotary drum 33 is changed or shifted with respect to a longitudinal direction of the test magnetic tape 2B. This relative shifting of the magnetic tape 2B to the rotary heads 34 signifies a shifting of the rotary heads 34 to the test magnetic tape 2B.

Accordingly, it is possible to stepwise shift the rotary heads 34 to the test magnetic tape 2B in the longitudinal direction thereof by causing the first control section 54 to output stepwise a shifting value to the capstan motor 46. Here, rotary head shifting system for shifting the rotary heads 34 comprises the capstan 22, the pinch roller 24, the AC head 25, the control pulse processing section 44, the capstan servo section 45 and the capstan motor 46 of the magnetic recording/reproducing apparatus 10B, and the first control section 54 and the control pulse phase-shifting section 55 of the personal computer 50.

Next, among the basic operations for measuring the track deviation, an explanation is given of an operation for stepwise shifting or tracking the rotary heads 34 in the longitudinal direction of the test magnetic tape 2B and another operation for stepwise measuring values of FM envelopes, wherein the amplitude values of the FM envelopes are obtained by envelope-detecting the video FM signal (or the audio FM signal) reproduced by the rotary heads 34 at a plurality of video FM measuring points (or audio FM measuring points) set up along the recorded tracks TP at every head shifting, referring to FIGS. 5 to 8.

In the description below, an exemplary ch-1 SP Mode video head 34a is employed for measuring the track deviation of an exemplary ch-1 SP Mode video track TPa. The measurement of the track deviation of the ch-2 SP Mode video recorded track TPb is performed in the same manner as mentioned above by the ch-2 SP Mode video head 34b. Thus, the description for the latter is omitted here.

In the case of the measurement of the track deviations of the ch-1 and ch-2 EP Mode video tracks TPc, TPd produced by the ch-1 and ch-2 EP Mode video heads 34c, 34d, the switch SW2 is placed on the EP Mode side. Thus, the description is omitted here.

Further, in the case of the measurement of the track deviations of the ch-1 and ch-2 audio tracks TPe, TPf produced by the ch-1 and ch-2 audio heads 34e, 34f, the switch SW3 is placed on the audio FM signal side. Thus, the description is omitted here.

Furthermore, in the case of the measurement of the track deviations of both the ch-1 SP Mode video tracks TPa and the ch-1 audio tracks TPe, the description will be given hereinafter.

As shown in FIG. 7, the ch-1 SP Mode video head 34a among the rotary heads 34 is stepwise shifted relatively in a direction orthogonal to the ch-1 SP Mode video track TPa as a result of the abovementioned longitudinal rotary head shifting manner, wherein the direction orthogonal to the ch-1 SP Mode video track TPa is defined as an X axis and a scanning direction of the ch-1 SP Mode video head 34a on the ch-1 SP Mode video track TPa is defined as a Y axis on the test magnetic tape 2B. Here, the ch-1 SP Mode video head 34a has an azimuth angle capable of reproducing the ch-1 SP Mode video track TPa. Thus, the ch-1 SP Mode video head 34a can reproduce the video FM signal from the ch-1 SP Mode video track TPa, but it can not reproduce the video FM signal from the ch-2 SP Mode video track TPb because of a different azimuth angle thereof.

First, the description is given of a shifting amount of the ch-1 SP Mode video head 34a.

When the shifting amount of the ch-1 SP Mode video head 34a is zero, the ch-1 SP Mode video head 34a is located at an initial shift position (or a preset shift position) Xo, wherein a center of the ch-1 SP Mode video head 34a coincides with a center line of a standard track having no track deviation of the ch-1 SP Mode video track TPa. The "standard track" means a track having its position and slant angle specified in an industry standard of such as VHS system. In case of the VHS system the position of the track is defined as the distance between the head-scanning end (end of recording) of the track and the position of the control head gap for recording the control pulse which controls the head position. And the slant angle is defined as the angle subtended by the track and the bottom edge (adjacent to the control track) of the tape.

According to the well-known VHS or S-VHS standard, a track width of each of the ch-1 and ch-2 SP Mode video tracks TPa, TPb is specified as 58 μm. Thus, the shifting amount of the ch-1 SP Mode video head 34a is determined to be within a predetermined range, taking account of the above width.

In this embodiment, the range of the shifting amount of the ch-1 SP Mode video head 34a is determined to be ±80 μm from the initial shift position Xo. In other words, the range of the shifting amount of the ch-1 SP Mode video head 34a is determined to be 2.75 times as large as the track width of 58 μm of the ch-1 SP Mode video track TPa in this case. However, the range thereof can be optionally determined.

Upon an operation of shifting the ch-1 SP Mode video head 34a, the position of the ch-1 SP Mode video head 34a is initialized to be located at the initial shift position Xo. Then, the ch-1 SP Mode video head 34a is shifted by −80 μm to a minus maximum shift position "X−80". After that, the ch-1 SP Mode video head 34a is stepwise shifted at a predetermined interval (for instance, an offset value of 2 μm) to a plus maximum shift position "X+80" via the initial shift position Xo. Specifically, the ch-1 SP Mode video head 34a is orderly shifted to shift positions of X−80, X−78, . . . X−2, Xo, X+2, . . . , X+78, X+80.

In the above, the ch-1 SP Mode video head 34a is controlled not to be shifted to a next shift position by the control section 54 until the ch-1 SP Mode video head 34a has completed scanning of at least one ch-1 SP Mode video track TPa. Further, the shift interval is determined so that the ch-1 SP Mode video head 34a never fail to be located at the initial shift position Xo, for instance, the shift interval is set to 2 μm.

After the ch-1 SP Mode video head 34a is shifted to a certain shift position, the ch-1 SP Mode video head 34a scans the track TPa to output video FM signals at a plurality of video FM measurement points set up along the ch-1 SP Mode video track TPa so that the amplitude values of the FM envelope are obtained by envelope-detecting the outputted video FM signals. The plurality of video FM measurement points are determined in accordance with the timing of the sampling pulses outputted from the sampling pulse generating section 51 as shown in FIG. 7.

Specifically, in the embodiment, the plurality of video FM measuring points are orderly determined as Y(0), Y(1), Y(2) . . . Y(129) from the scanning start to the scanning end of the ch-1 SP Mode video head 34a in accordance with the timing of 130 sampling pulses generated per one field (1 V).

Next, the description is given of a variation of the FM envelope when a video head is stepwise shifted from the minus maximum shift position X−80 to the plus maximum shift position X+80, referring to FIGS. 8-(1) through 8-(9).

Referring to FIG. 8-(1), reference characters TPa (n−1), TPb (n−1), TPa (n) are provided to clarify positional relations regarding the ch-1 SP Mode video track TPa and the ch-2 SP Mode video track TPb which are adjacent to each other, wherein the ch-2 SP Mode video track TPb (n−1) is recorded by being interposed between the adjacent ch-1 SP Mode video tracks TPa (n−1) and TPa (n). In the reference characters TPa (n−1), TPb (n−1), TPa (n), the subsidiary reference characters (n−1) and (n) denote that they are orderly disposed on the test magnetic tape 2B with respect to a certain channel (ch). In FIGS. 8-(1) through 8-(9), the subsidiary reference characters (n)~(v) are provided for convenience sake on the test magnetic tape 2B.

It is noted that upon measuring a track deviation of, for instance, the ch-1 SP Mode video track TPa with the ch-1 SP Mode video head 34a, a relative positional relation between the ch-1 SP Mode video track TPa and the ch-1 SP Mode video head 34a is always held, though the test magnetic tape 2B runs at a constant speed. In other words, it is possible to start measuring any track to which the ch-1 SP Mode video head 34a is shifted and held at the shifted position.

In FIGS. 8-(1) to 8-(9), the description is given of a case where the track deviation of the ch-1 SP Mode video track TPa is measured. Further, the width of the ch-1 SP Mode video track TPa is made to be 58 μm, and the track width of the ch-1 SP Mode video head 34a is made to be approximately the same as that of the ch-1 SP Mode video track TPa. Further, when obtaining the values of the FM envelope, the amplitude values are actually obtained as mean values of the plurality of the FM envelopes detected from a plurality of video FM signals reproduced from a plurality of the ch-1 SP Mode video tracks TPa at a certain shifting position. However, the description of repeated measurement operations to obtained the mean values is omitted for simplicity.

The operations of the measurement are as follows:

(1) As shown in FIG. 8-(1), after the position of the 1-ch SP Mode video head 34a is initialized to the initial shift position Xo, the ch-1 SP Mode video head 34a is shifted to the minus maximum shift position X−80 in a reverse direction of an arrow (X). While the test magnetic tape 2B runs generally in a direction of an arrow (Y), the ch-1 SP Mode video head 34a scans partially, in the direction of the arrow (Y), the ch-1 SP Mode video track TPa (n−1) which is positioned before the ch-1 SP Mode video track TPa (n). Thus, the video FM signal corresponding to a hatched area is reproduced from the ch-1 SP Mode video head 34a.

(2) As shown in FIG. 8-(2), the ch-1 SP Mode video head 34a is shifted to the shift position X−60 in a direction of the arrow (X). While the test magnetic tape 2B runs generally in the direction of the arrow (Y), the video head 34a scans partially, in the direction of the arrow (Y), the ch-1 SP Mode video track TPa (o−1), the ch-2 SP Mode video track TPb (o−1) and the ch-1 SP Mode video tracks TPa (o). At this shift position X−60, the ch-1 SP Mode video head 34a scans partially the ch-2 SP Mode video track TPb (o−1) of which the recorded azimuth angle is different from the azimuth angle of the ch-1 SP Mode video head 34a, so that the video FM signal is not outputted from the ch-2 SP Mode video track TPb (o−1). Thus, the video FM signal corresponding to slightly hatched areas of the ch-1 SP Mode video tracks TPa (o−1) and TPa (o) is reproduced from the ch-1 SP Mode video head 34a.

(3) As shown in FIG. 8-(3), the ch-1 SP Mode video head 34a is shifted to the shift position X−40. The ch-1 SP Mode video head 34a scans partially the ch-2 SP Mode video track TPb (p−1) and the ch-1 SP Mode video tracks TPa (p). At this shift position X−40, the video FM signal corresponding to hatched areas of the ch-1 SP Mode video tracks TPa (p) is reproduced from the ch-1 SP Mode video head 34a.

(4) As shown in FIG. 8-(4), the ch-1 SP Mode video head 34a is shifted to the shift position X−20. The ch-1 SP Mode video head 34a scans partially the ch-1 SP Mode video track TPa (q). At this shift position X−20, the video FM signal corresponding to hatched area of the ch-1 SP Mode video track TPa (q) is reproduced from the ch-1 SP Mode video head 34a.

(5) As shown in FIG. 8-(5), the ch-1 SP Mode video head 34a is returned to the initial shift position Xo. The 1-ch SP Mode video head 34a scans almost all over the ch-1 SP Mode video track TP*a* (r). At this shift position Xo, the video FM signal corresponding to hatched area of almost all the ch-1 SP Mode video tracks TP*a* (r) is reproduced from the ch-1 SP Mode video head 34*a*.

(6) As shown in FIG. 8-(6), the ch-1 SP Mode video head 34*a* is shifted to the shift position X+20. The ch-1 SP Mode video head 34*a* scans partially the ch-1 SP Mode video track TP*a* (s). At this shift position X+20, the video FM signal corresponding to the hatched area of the ch-1 SP Mode video tracks TP*a* (s) is reproduced from the ch-1 SP Mode video head 34*a*.

(7) As shown in FIG. 8-(7), the ch-1 SP Mode video head 34*a* is shifted to the shift position X+40. The ch-1 SP Mode video head 34*a* scans partially the ch-1 SP Mode video track TP*a* (t) and the ch-2 SP Mode video track TP*b* (t). At this shift position X+40, the video FM signal corresponding to hatched area of the ch-1 SP Mode video track TP*a* (t) is reproduced from the ch-1 SP Mode video head 34*a*.

(8) As shown in FIG. 8-(8), the ch-1 SP Mode video head 34*a* is shifted to the shift position X+60. The ch-1 SP Mode video head 34*a* scans partially the ch-1 SP Mode video track TP*a* (u) and ch-2 SP Mode video track TP*b* (u) and the ch-1 SP Mode video track TP*a* (u+1) which is positioned behind the 1-ch SP Mode video track TP*a* (u). At this shift position X+60, the video FM signal corresponding to hatched areas of the ch-1 SP Mode video tracks TP*a* (u) and TP*a* (u+1) is reproduced from the ch-1 SP Mode video head 34*a*.

(9) As shown in FIG. 8-(9), the ch-1 SP Mode video head 34*a* is shifted to the plus maximum shift position X+80. The ch-1 SP Mode video head 34*a* scans partially the ch-1 SP Mode video track TP*a* (v+1) which is behind the ch-1 SP Mode video track TP*a* (v). At this plus maximum shift position X+80, the video FM signal corresponding to hatched areas of the 1-ch SP Mode video track TP*a* (v+1) is reproduced from the ch-1 SP Mode video head 34*a*. When the scanning at the plus maximum shift position X+80 is over, all the data of the video FM signal are acquired.

As mentioned above, when the ch-1 SP Mode video head 34*a* is stepwise shifted as shown in FIGS. 8-(1) to 8-(9), the amplitude values of the FM envelope obtained by envelope-detecting the obtained video FM signals vary depending on the positions where the track deviations are developed. It will be understood that this variation corresponds to the hatched areas shown in FIGS. 8-(1) to 8-(9).

Referring to FIG. 5 again, when the data of the video FM signal is acquired into the personal computer 50 by causing the ch-1 SP Mode video head 34*a* to stepwise shift and to scan each of the recorded tracks, the acquisition of the data of the video FM signal is started by a trigger pulse generated by the trigger pulse generating section 53, and the ch-1 SP Mode video head 34*a* is shifted from the initial shift position Xo to the minus maximum shift position X−80. While the ch-1 SP Mode video head 34*a* is shifted from the minus maximum shift position X−80 to the plus maximum shift position X+80, the FM envelope signals obtained by envelope-detecting the video FM signals are outputted in a shifting order, from the envelope detecting section 52 as shown in FIG. 9, and are inputted to the A/D converting section 56.

In the A/D converting section 56, the FM envelope signals are A/D-converted in accordance with the timing of the sampling pulse generated by the sampling pulse generating section 51. Specifically, the amplitude values of the FM envelope at the plurality of video FM measuring points Y(0) to Y(129) are respectively converted into digital data and the digital data are inputted to a track deviation data forming section 57. The track deviation data forming section 57 is provided with a memory section 57*a* and a first arithmetic section 57*b*. The data transferred from the A/D converting section 56 are arranged as shown in FIG. 10 and are temporarily stored in the memory section 57*a*. On the other hand, the 1st arithmetic section 57*b* produces track deviation data by arithmetically processing the data from the memory section 57*a* as follows.

Here, the description is given in detail of the procedure for producing the track deviation data in the arithmetic section 57*b*, referring to FIGS. 5, 11(A), 11(B), 12(A) and 12(B), which is one of the main features of the present invention.

First, in the 1st arithmetic section 57*b* of the track deviation forming section 57, the digital data acquired at every video FM measuring points Y(0) to Y(129) are re-arranged in a different manner from the arrangement in the memory section 57*a* as follows.

FIG. 11(A) schematically shows a more simplified shifting operation of the ch-1 SP Mode video head 34*a* compared with FIGS. 8-(1) to 8-(9).

In FIG. 11(A), the recorded tracks depicted with two-dotted lines are standard tracks having no track deviation and ones depicted with real lines have track deviations.

Further, arrow marked positions represented by ①, ②, ③, ④ and ⑤ show the shift positions of the ch-1 SP Mode video head 34*a*. The ch-1 SP Mode video head 34*a* scans the ch-1 SP Mode video track TP*a* along directions of the arrows. Here, the reference characters Xo denote the initial shift position of the ch-1 SP Mode video head 34*a* which corresponds to a center of the standard recorded track.

When the ch-1 SP Mode video head 34*a* scan the ch-1 SP Mode video track TP*a*, a part of the ch-1 SP Mode video track TP*a* corresponding to a video FM measuring point (a) is assumed to be free from the track deviation. Part of the 1-ch SP Mode video track TP*a* corresponding to a video FM measuring point (b) is assumed to be slightly deviated away in a direction of a plus (+) side from the standard track. Part thereof corresponding to a video FM measuring point (c) is assumed to be largely curved in the direction of the plus (+) side from the standard track.

FIG. 11(B) is a diagram for explaining the arrangement of digital data acquired on the basis of a method shown in FIG. 11(A). In FIG. 11(B), an abscissa represents shift directions of the ch-1 SP Mode video head 34*a* and an ordinate represents video FM levels (amplitude values of FM envelope signals).

Thus, in the 1st arithmetic section 57*b* of the track deviation data forming section 57, the digital data acquired at every video FM measuring points Y(0) to Y(129) are rearranged in the abovementioned manner.

As seen from FIG. 11(B), through the head shift positions ① through ⑤, there occurs always a maximum video FM level presentation at every video FM measuring point (a), (b) or (c). Further, the head shift position at which the maximum video FM level occurs different depending on the FM measuring points (a), (b) or (c).

Specifically, at the video FM measuring point (a), the head shift position, at which the maximum video FM level occurs, approximately coincides with the initial shift position Xo because the pattern of the ch-1 SP Mode video track TP*a* approximately agrees with the pattern of the standard track having no track deviation. At the video FM measuring point (b), the head shift position, at which the maximum video FM level occurs, is slightly deviated by δ1 from the initial shift position Xo in a (+) direction on the abscissa (X) because the pattern of the ch-1 SP Mode video track TP*a* is slightly curved in a (+) direction away from the pattern of the standard track as shown in FIG. 11(A). At the video FM measuring point (c), the head shift position, at which the maximum video FM level occurs, is largely deviated by δ2 from the initial shift position Xo in the (+) direction on the abscissa (X) because the pattern of the ch-1 SP Mode video track TP$a$ is largely curved in a (+) direction away from the pattern of the standard track.

In the above, when the pattern of the ch-1 SP Mode video track TP$a$ is curved in a (−) direction to the pattern of the standard track, a deviation value (or displacement value) δ is generated in a (−) direction on the abscissa (X). However, the illustration is omitted here.

After obtaining the deviation values δ each defined as a deviation value from the initial shift position Xo to a shifted position at which the maximum video FM level occurs at a certain video FM measuring point, it is possible to determine a state of the overall track deviation referred to the standard track by obtaining a locus of the deviation values δ represented at a plurality of the video FM measuring positions. And, in the present invention, the deviation values δ of the plurality of the video FM measuring points are obtained by the calculation in the 1st arithmetic section 57$b$ of the track deviation data forming section 57.

Further in FIG. 11(B), it is verified from experiments that the video FM level change as a function of the head shift positions ① through ⑤, exhibits a symmetrical figure horizontally with respect to a peak thereof. In other words, the video FM maximum level resides on a vertex of the symmetrical figure thereof. This relation is utilized to obtain, by calculation, the head shift position of the ch-1 SP Mode video head 34$a$ corresponding to the video FM maximum level.

Next, the description is given in detail of the procedure for calculating the shift position of the ch-1 SP Mode video head 34$a$ which causes the video FM maximum level at a certain video FM measuring point, referring to FIGS. 12(A) and 12(B).

FIG. 12(A) is a diagram for explaining the arrangement of digital data in the same manner as shown in FIG. 11(B), wherein a track width of a recording head is approximately the same as that of a reproducing head; and FIG. 12(B) is a diagram for explaining the arrangement of digital data in the same manner as shown in FIG. 11(B), wherein a track width of the recording head is narrower than that of the reproducing head. In FIGS. 12(A) and 12(B), the abscissa represents the shift directions of the ch-1 SP Mode video head 34$a$ and the ordinate represents the video FM levels (amplitude values of FM envelope signals) as mentioned in the foregoing.

As shown FIG. 12(A), when the track width of the recording head is approximately the same as that of the reproducing head, the reproducing characteristics by the reproducing head is distinctive. That is, the video FM maximum level (peak) among the the plural digital data clearly appears. However, as shown in FIG. 12(B), when the track width of the recording head is narrower than that of the reproducing head, the reproducing characteristics by the reproducing head does not exhibit a clear peak. Thus, it is difficult to determine an exact head shift position causing the video FM maximum level from the comparison among the plural digital data as will be understood from the symmetry of the figure.

In the present invention, to increase a reliability of the measurement, a mean value principle of the digital data is employed by repeatedly scanning the plural ch-1 SP Mode video tracks TP$a$ at a certain shift position.

Further, upon calculating the shift position which causes the video FM maximum level, first, a maximum value is selected among all the plural digital data, and a minimum value is selected among data plotted in a left side of the graphs with respect to the initial shift position Xo in FIGS. 12(A) and 12(B). Next, there are determined a point ① having an output level of 85% to the maximum value and a point ② having an output level "SL" represented by the following formula (1).

$$SL = \{(\text{maximum value} - \text{minimum value}) \times 15/100 + \text{minimum value}\} \quad (1)$$

Then a linear line L1 connecting the points ① and ② is obtained by causing the plural digital data obtained from the plural scans of the ch-1 SP Mode video heads 34$a$ and by a conventional "method of least squares".

Next, a minimum value is also selected among data plotted in the right side of the graph with respect to the initial shift position Xo, and a point ③ having an output level of 85% to the maximum value and a point ④ having an output level "SL" represented by the formula (1). Then, a linear line L2 connecting the points ③ and ④ is obtained by causing the plural digital data obtained from the plural scans of the ch-1 SP Mode video heads 34$a$ and by the "method of least squares" as well. Further, an intersection ⑤ of the linear lines L1 and L2 is obtained.

It is noted that the linear lines L1 and L2 are approximately symmetrical to the intersection ⑤. As mentioned in the foregoing, the video FM maximum level coincides with the vertex of the symmetrical figure. Accordingly, the digital data of the intersection ⑤ becomes the maximum value, and an intersection of a vertical line passing through the intersection ⑤ and the abscissa becomes the shift position of the ch-1 SP Mode video head 34$a$ which causes the maximum value.

Accordingly, the deviation value δ from the initial shift position Xo to the shifting position of the ch-1 SP Mode video head 34$a$ causing the video FM maximum level (the intersection ⑤) becomes a track deviation data obtained from a certain video FM measuring point.

In the same manner as mentioned in the above, other deviation values (or track deviation data) δ are obtained at other video FM measuring points. Here, the values of the track deviation data δ may be different from each other, and each of the values thereof has either a (+) value or a (−) value with respect to the initial shift position Xo. Accordingly, it is possible to evaluate the track deviation of the recorded track by obtaining a locus of the plurality of the track deviation data δ. These obtained results are stored in the track deviation data storing section 58.

Operation of the measurement apparatus including the data processing in the foregoing are carried out according to the program stored in the recording medium "D" by the 1st control section 54 which may be realized by an MPU.

These track deviation data δ stored in the track deviation data storing section 58 can be selectively displayed either in a ternary manner as shown in FIGS. 13 (A) and 13(B) or in a manner as shown in FIGS. 14(A) and 14(B) responsive to an output from an output section 61 as will be explained hereinafter.

FIGS. 13(A) and 13(B) are resultant charts obtained, each displaying whole track deviation data ternary, i.e., the FM envelope level in relation to the head scanning and displacement directions, wherein FIG. 13(A) shows a resultant chart when the track deviation is small, and FIG. 13(B) shows a resultant chart when the track deviation is larger.

FIGS. 14(A) and 14(B) are graphs, each displaying track deviation data of the magnetic recordig/reproducing apparatus, wherein FIG. 14(A) shows resultant curves of ch-1 and ch-2 video tracks when the track deviations are small, and FIG. 14(B) shows resultant curves of ch-1 and ch-2 apparatus, wherein FIG. 14(A) shows resultant curves of ch-1

In the above, the magnetic recording/reproducing and FIG. 14 (B) shows resultant curves of ch-1 and ch-2 deviation is minimized. But, it is impossible technically to make the track deviation to be zero. Accordingly, in the present invention, the track deviation caused at the adjusted state of the apparatus 10B (or an initial state) is calibrated in the conventional manner by using a microscope as explained for the prior art. The obtained data inherent to the apparatus 10B are stored in a track deviation compensation data memory section 59 in the same data form as mentioned in the foregoing. Needless to say, it is unnecessary to provide the track deviation compensation data memory section 59 when the apparatus 10B can be adjusted to no track deviation.

As a result, it is possible to display compensated data in a visible manner as shown in FIGS. 13(A) and 13(B) or in FIGS. 14(A) and 14(B) by subtracting the track deviation compensation data from the obtained track deviation data $\delta$ in a second arithmetic section 60 of the personal computer 50.

In the presentation forms of the track deviation data in FIGS. 13(A) and 13(B), an abscissa represents a shift direction of the video head and an ordinate represents a scanning direction of the video head and the FM envelope level, wherein the FM envelope level is also presented in relation to the head scanning and displacement directions. Thus, it is possible to display the track deviation data ternary allowing an evaluation of the measured data in a visible manner.

On the other hand, in the presentation forms of the track deviation data in FIGS. 14(A) and 14(B), an abscissa represents a scanning direction of the video head and an ordinate represents the track deviation data $\delta$, wherein an acceptable range is also presented. Thereby, it is possible to evaluate in a visible manner if the track deviation data $\delta$ are within the acceptable range according to the standard. In FIGS. 14(A) and 14(B), both the ch-1 SP Mode video track TP$a$ and the ch-2 SP Mode video track TP$b$ are shown.

Next, the description is given of the procedure of the track deviation measuring method, referring to FIGS. 5, 7, 8, 12, 13 and 14.

(1) Step 1: The test magnetic tape 2B is installed in the magnetic recording/reproducing apparatus 10B adjusted so as not to have the track deviation.

Further, upon starting the measurement, the program mentioned before for measuring the track deviation corresponding to each step is preliminarily stored in the recording medium "D" provided in the personal computer 50. When a command for starting is inputted to the personal computer 50 through the keyboard 62 of the personal computer 50, a display of "starting" is presented on a display panel (not shown). Then, according to an instruction displayed on the display panel, the magnetic recording/reproducing apparatus becomes possible to be operated by separating the control pulse processing section 44 from the capstan servo section 45 by opening the switch SW1 through the control board 48 of the apparatus 10B, so that a conventional automatic control circuit (not shown) is disabled and a capstan servo section 45 becomes under control of the personal computer 50.

Here, the description is given of a case where the switch SW2 is placed on the SP Mode side, and the switch SW3 is placed on the video FM signal side, and either of the ch-1 SP Mode video heads 34$a$ 34$b$ are is selected from the video heads 34.

(2) Step 2: The test magnetic tape 2B is moved by being helically wound around the rotary drum 30.

(3) Step 3: The ch-1 SP Mode video head 34$a$, for instance, is initialized to be shifted to the initial shift position Xo.

(4) Step 4: The ch-1 SP Mode video head 34$a$ is shifted to the minus maximum shift position X-80.

(5) Step 5: The ch-1 SP Mode video head 34$a$ is stepwise shifted from the minus maximum shift position X-80 to shift positions X-78, ..., X-2, Xo, X+2, ..., X+78 and the plus maximum shift position X+80. At respective head shift positions, the values of the video FM signal levels are measured at the plural video FM measuring points set up along the ch-1 SP Mode video track TP$a$ scanned by the ch-1 SP Mode video head 34$a$, and are outputted as the amplitude values of the FM envelope from the envelope detecting section 52. These amplitude values of the FM envelope are converted to digital data by the A/D converting section 56, and are temporarily stored in the memory section 57$a$ of the track deviation data forming section 57.

(6) Step 6: After the digital data stored in the memory section 57$a$ are re-arranged by the 1st arithmetic section 57$b$, according to the measuring procedure previously explained with FIGS. 12(A), 12(B), the shift position of the ch-1 SP Mode video head 34$a$ which causes the maximum value among the plural digital data at a certain video FM measuring point, is calculated. Other shift positions of the ch-1 SP Mode video head 34$a$ which causes the maximum values are also calculated in the same manner as mentioned in the above. Further, the deviation values $\delta$ from the initial shift position Xo are respectively calculated, resulting in the track deviation data $\delta$ equivalent to the displacement values $\delta$.

(7) Step 7: The track deviation compensated data are obtained by subtracting the track deviation compensation data preliminarily stored in the track deviation compensation data memory section 59, from the track deviation data $\delta$.

(8) Step 8: The compensated track deviation data are outputted from an output section 61 in a manner shown in FIGS. 13(A), 13(B) or 14(A), 14(B).

In the case of measuring the track deviations of the ch-1 and ch-2 EP Mode video recorded tracks TP$c$, TP$d$, it is possible to measure them by placing the switch SW2 on the EP Mode side.

Figure 2:
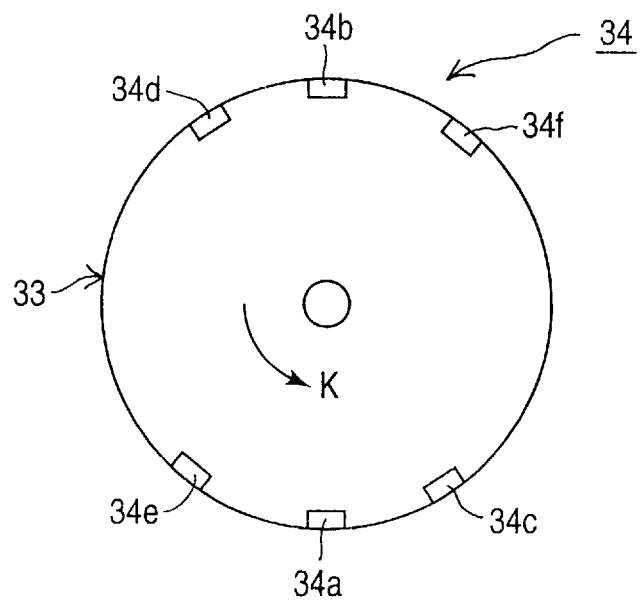
FIG. 2 is a plan view showing magnetic heads installed in a rotary drum in the ordinary magnetic recording/reproducing apparatus shown in FIG. 1.

Further, by placing the switch SW3 on the audio FM signal side, it is possible to measure the track deviations of the ch-1 and ch-2 audio tracks TP$e$, TP$f$ of either the SP Mode or the EP Mode through the SW2. Here, as shown in FIG. 2 in the prior art, the ch-1 and ch-2 audio heads 34$e$, 34$f$ are provided on the upper rotary drum 33 by being largely separated from the ch-1 and ch-2 SP Mode video heads 34$a$, 34$b$ and the ch-1 and ch-2 EP Mode video heads, 34$c$ and 34$d$. Thus, in the present invention, the measurement program is preliminarily arranged so that a part of data obtained by the ch-1 audio head 34$e$, for instance, corresponding to the separation distance between the ch-1 audio head 34$e$ and the ch-1 SP Mode video head 34$a$, for instance, can be removed from the obtained data. The amount of removal of the data can be optionally set up by changing a part of the measurement program.

Next, referring to FIGS. 5 and 15 through 18, the description is given of a measuring procedure employing the time division control method, wherein both the video recorded track and the corresponding audio recorded track are measured together by alternately placing the switch SW3 on the connector 12 or 13.

It is noted that FIGS. 15, 16(A) or 16(B), and 17 respectively correspond to FIGS. 12(A) or 12(B), 13(A) or 13(B), and 14(A) or 14(B) in the foregoing. Thus, the explanation of FIGS. 15 through 17 is given where necessary.

The procedure thereof is as follows:

(1) Step 11: It is set up that the track deviations of, for instance, both the ch-1 SP Mode video track TPa and the ch-1 audio track TPe can be measured together by operating the keyboard 62 of the personal computer 50. Thereby, the switch SW3 is alternately switched on the connector T12 side for the video FM signal input or the connector T13 side for the audio FM signal input by the first control section 54 depending on the measuring program stored in the recording medium D in the personal computer 50. Here, the switching of the switch SW3 is alternately performed time divisionally between the ch-1 SP Mode video head 34a and the ch-1 audio head 34e.

(2) Step 12: The test magnetic tape 2B is transported by being helically wound around the rotary drum 30.

(3) Step 13: The ch-1 SP Mode video head 34a and the ch-1 audio head 34e are initialized to be shifted to the initial shift position Xo. Here, the shifting operation of the both heads 34a, 34e are performed by the control pulses of which the phases are displaced. Thus, the both heads 34a, 34e are shifted together. In this regard, the program is set up so that a part of the data which corresponds to the separation distance between the ch-1 audio head 34e and the ch-1 SP Mode video head 34a, obtained from the audio FM measuring point by the ch-1 audio head 34e, can be removed therefrom.

(4) Step 14: The ch-1 SP Mode video head 34a and the ch-1 audio head 34e are shifted to the minus maximum shift position X−80.

(5) Step 15: After placing the switch SW3 on the connector T12 for the video FM signal input, the amplitude values of the video FM signals are measured at the plural video FM measuring points set up along the ch-1 SP Mode video track TPa scanned by the ch-1 SP Mode video head 34a, and are outputted as the values of the FM envelope from the envelope detecting section 52. These amplitude values of the FM envelope are converted to digital data by the A/D converting section 56, and are temporarily stored in the memory section 57a of the track deviation data forming section 57.

Then, after placing the switch SW3 on the connector T13 for the audio FM signal input, the amplitude values of the audio FM signals are measured at the plural audio FM measuring points set up along the ch-1 SP Mode audio track TPe scanned by the ch-1 audio head 34e, and are outputted as the amplitude values of the FM envelope from the envelope detecting section 52. These amplitude values of the FM envelope are converted to digital data by the A/D converting section 56, and are temporarily stored in the memory section 57a of the track deviation data forming section 57. Here, both an audio digital data memory domain and a video digital data memory domain are provided in the memory section 57a.

Then, after the both heads 34a, 34e are shifted to the shift position X−78, the amplitude values of audio and video FM envelopes are alternately measured and temporarily stored in the memory section 57a. These operation are continued until the both heads 34a, 34e come to the plus maximum shift position X+80.

(6) Step 16: After the audio digital data and the video digital data stored in the memory section 57a are rearranged in the arithmetic section 57b, according to the measuring procedure as shown in FIG. 15, which has been explained by using FIGS. 12(A), 12(B), the shift positions of the ch-1 SP Mode video head 34a and the ch-1 audio head 34e which causes the maximum values among the plural digital data at certain video and audio FM measuring points, are calculated. Other shift positions of the ch-1 SP Mode video head 34a and the ch-1 audio head 34e causing the maximum values are also calculated in the same manner as mentioned in the above. Further, the deviation values δ from the shift positions of the ch-1 SP Mode video head 34a and the ch-1 audio head 34e causing the maximum values to the initial shift position Xo are respectively calculated, resulting in the respective track deviation data δ of the ch-1 audio track TPe and the ch-1 SP Mode video track TPa equivalent to the respective displacement values δ.

(7) Step 17: The audio and video compensated track deviation data are respectively obtained by subtracting the audio and video track deviation compensation data preliminarily stored in the track deviation compensation data memory section 59, from the audio and video track deviation data δ.

(8) Step 18: The compensated track deviation data are outputted from the output section 61 in a manner shown in FIGS. 16(A), 16(B) or 17.

As shown in FIGS. 16(A), 16(B), the video and audio track deviation data are individually shown, but it is possible to display them on the display device in a superimposed manner with different colors.

Through the description, the magnetic recording/reproducing apparatus 10B conforming to the well-known VHS standard or the S-VHS standard is applied to the embodiment, however, magnetic recording/reproducing apparatuses of other standards employing such a helical scanning system can be applied to the present invention.

As mentioned in the foregoing, the magnetic recording/reproducing apparatus of the present invention is constructed as such that a personal computer is electrically connected to the magnetic recording/reproducing apparatus through connectors, and that the track deviation caused by the apparatus is measured through the personal computer upon an operation by installing a test magnetic tape formed with recorded tracks having almost no track deviation in the apparatus so as to be helically wound in a predetermined angular range and direction around the rotary drum rotating together with magnetic heads of the apparatus.

Thus, it is possible to perform an automatic and speedy measurement of its own track deviation developed in every apparatus by running the test magnetic tape in every apparatus in the factory as long as the test magnetic tape is prepared. This feature enables an instant evaluation of a track deviation characteristic of the magnetic recording/reproducing apparatus produced in the factory, resulting in a speedy judgement of the interchangeability of the magnetic tape of the magnetic recording apparatus.

Further, it is possible to reuse the test magnetic tape 2B again because the test magnetic tape 2B does not need to be cut at all.

Furthermore, it is possible to simultaneously measure the track deviations of both the audio recorded track formed in a deeper portion of the magnetic layer and the video recorded track recorded over the audio recorded track.

What is claimed is:

1. Magnetic recording/reproducing apparatus constructed as such that a personal computer is electrically connected to the magnetic recording/reproducing apparatus through connectors, and that a track deviation caused by the apparatus is measured through the personal computer upon an operation by installing a test magnetic tape formed with recorded tracks having almost no track deviation in the apparatus so as to be helically wound in a predetermined angular range and direction around a rotary drum rotating together with magnetic heads of the apparatus, the magnetic recording/reproducing apparatus comprising:

means for stepwise shifting the magnetic head in a longitudinal direction of the magnetic tape for causing magnetic head positions to displace stepwise and relatively with respect to the recorded tracks of the test magnetic tape along a track traversing line of the recorded tracks in response to a command directed from the personal computer; and means for outputting values of an FM signal measured at a plural measuring points predetermined on the test magnetic tape along a head scanning direction of the recorded tracks at every stepwise shifted magnetic head positions as the magnetic heads scanning the recorded tracks of the test magnetic tape, the values of the FM signal outputted being inputted to the personal computer for processing the values.

2. Magnetic recording/reproducing apparatus as claimed in claim 1, wherein the values of the FM signal are at least an output signal selectively reproduced from a video signal track and an audio signal track.

3. Magnetic recording/reproducing apparatus as claimed in as claimed in claim 2, wherein the audio signal track is formed on a deeper portion of the magnetic tape and the video signal track is formed over the audio signal track.

\* \* \* \* \*